(12) United States Patent
Yuan et al.

(10) Patent No.: US 12,455,326 B2
(45) Date of Patent: Oct. 28, 2025

(54) METHOD AND APPARATUS FOR DETECTING LITHIUM PLATING, AND METHOD AND APPARATUS FOR OBTAINING POLARIZATION PROPORTION

(71) Applicant: SHENZHEN YINWANG INTELLIGENT TECHNOLOGIES CO., LTD., Shenzhen (CN)

(72) Inventors: Shifei Yuan, Shenzhen (CN); Bingxiao Liu, Shanghai (CN); Zhiwei Wu, Shanghai (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 477 days.

(21) Appl. No.: 17/976,402

(22) Filed: Oct. 28, 2022

(65) Prior Publication Data
US 2023/0052544 A1    Feb. 16, 2023

Related U.S. Application Data

(63) Continuation of application No. PCT/CN2020/088503, filed on Apr. 30, 2020.

(51) Int. Cl.
*G01R 31/396*    (2019.01)
*G01R 31/364*    (2019.01)
(Continued)

(52) U.S. Cl.
CPC ......... *G01R 31/396* (2019.01); *G01R 31/364* (2019.01); *G01R 31/388* (2019.01); *H01M 10/4285* (2013.01); *H01M 10/44* (2013.01)

(58) Field of Classification Search
None
See application file for complete search history.

(56) References Cited

U.S. PATENT DOCUMENTS 8,907,674 B2 * 12/2014 Takahashi ............ H01M 10/42
                                                        324/432
10,367,236 B2   7/2019 Zhu et al.
(Continued)

FOREIGN PATENT DOCUMENTS

CN    101300711 A    11/2008
CN    102818998 A    12/2012
(Continued)

OTHER PUBLICATIONS

Review-Lithium Ion Plating Detection Methods in Li-ion batteries (Janakiraman et al., 2020, J. Electrochem. Soc., 167, 160552, 23 total pages) (Year: 2020).*

(Continued)

*Primary Examiner* — Kevin M Bernatz
(74) *Attorney, Agent, or Firm* — Fish & Richardson P.C.

(57) ABSTRACT

Example methods and apparatuses for detecting lithium plating and obtaining a polarization proportion are provided. One example method includes obtaining an open-circuit voltage of a rechargeable battery and a negative electrode open-circuit voltage of the rechargeable battery based on a state of charge of the rechargeable battery. A negative electrode polarization voltage of the rechargeable battery is obtained based on the open-circuit voltage, a terminal voltage of the rechargeable battery, and a polarization proportion of the rechargeable battery. A negative electrode voltage of the rechargeable battery is obtained based on the negative electrode open-circuit voltage and the negative electrode polarization voltage. It is determined, based on the negative electrode voltage, whether lithium plating occurs in the rechargeable battery.

20 Claims, 17 Drawing Sheets

(51) Int. Cl.
*G01R 31/388* (2019.01)
*H01M 10/42* (2006.01)
*H01M 10/44* (2006.01)

(56) References Cited

U.S. PATENT DOCUMENTS

| | | | |
|---|---|---|---|
| 2019/0152341 A1* | 5/2019 | Jin | H01M 10/44 |
| 2019/0198856 A1 | 6/2019 | Wood, III et al. | |
| 2019/0379090 A1* | 12/2019 | Verbrugge | H01M 4/133 |

FOREIGN PATENT DOCUMENTS

| | | |
|---|---|---|
| CN | 104769768 A | 7/2015 |
| CN | 105223508 A | 1/2016 |
| CN | 105866695 A | 8/2016 |
| CN | 105932349 A | 9/2016 |
| CN | 106450536 A | 2/2017 |
| CN | 108761341 A | 11/2018 |
| CN | 108808130 A | 11/2018 |
| CN | 109613436 A | 4/2019 |
| CN | 110161417 A | 8/2019 |
| JP | 2010243447 A | 10/2010 |
| JP | 2014017074 A | 1/2014 |
| JP | 2016161448 A | 9/2016 |
| JP | 2018009941 A | 1/2018 |
| JP | 2019114475 A | 7/2019 |
| WO | 2014112181 A1 | 7/2014 |
| WO | 2017056732 A1 | 4/2017 |
| WO | 2018235995 A1 | 12/2018 |

OTHER PUBLICATIONS

Office Action in Japanese Appln. No. 2022-566302, mailed on Dec. 19, 2023, 3 pages (with English translation).

Sun, "Safe fast charging algorithm of lithium ion battery based on an electrochemical model," J Automotive Safety and Energy, vol. 8, No. 1, Mar. 2017, 10 pages (with partial English machine translation).

Janakiraman et al., "Review-Lithium Plating Detection Methods in Li-Ion Batteries" Journal of The Electrochemical Society, vol. 167, Sep. 15, 2020, 23 pages.

Chu et al., "Non-destructive fast charging algorithm of lithium-ion batteries basedon the control-oriented electrochemical model," Applied Energy 204, Mar. 2017, 11 pages.

Extended European Search Report in European Appln No. 20932967. 1, dated Apr. 25, 2023, 5 pages.

International Search Report and Written Opinion in International Appln. No. PCT/CN2020/088503, mailed on Feb. 3, 2021, 18 pages (with English translation).

\* cited by examiner

METHOD AND APPARATUS FOR DETECTING LITHIUM PLATING, AND METHOD AND APPARATUS FOR OBTAINING POLARIZATION PROPORTION

CROSS-REFERENCE TO RELATED APPLICATIONS

This application is a continuation of International Application No. PCT/CN 2020/088503, filed on Apr. 30, 2020. The disclosure of which is hereby incorporated by reference in its entirety.

TECHNICAL FIELD

This application relates to the field of rechargeable battery technologies, and in particular, to a method and apparatus for detecting lithium plating, and a method and apparatus for obtaining a polarization proportion.

BACKGROUND

With the development of new energy technologies, more users travel by electric vehicles, and battery safety of electric vehicles attracts increasing attention. Lithium plating in a rechargeable battery of an electric vehicle is a major factor affecting battery safety. Therefore, diagnosis and prevention of lithium plating in a rechargeable battery have become an important technical work.

In a related technology, a rechargeable battery may be transformed into a battery having a positive electrode, a negative electrode, and a reference electrode. Then, an electrical potential of the negative electrode relative to the reference electrode is measured in a charging process, and whether lithium plating occurs in the rechargeable battery is determined based on the electrical potential of the negative electrode relative to the reference electrode. If an electric potential platform of approximately 0 V appears after three electric potential platforms greater than 0 V appear in terms of the electrical potential of the negative electrode relative to the reference electrode in the charging process, it is determined that lithium plating occurs in the rechargeable battery.

However, accuracy of a measured electrical potential of the negative electrode relative to the reference electrode is affected by factors such as a material of the reference electrode and a location of the reference electrode in the rechargeable battery. As a result, accuracy of a lithium plating detection result is poor.

SUMMARY

Embodiments of this application provide a method and apparatus for detecting lithium plating, and a method and apparatus for obtaining a polarization proportion, to improve accuracy of lithium plating detection.

According to one aspect, this application provides a method for detecting lithium plating in a rechargeable battery. The method includes: obtaining an open-circuit voltage of the rechargeable battery and a negative electrode open-circuit voltage of the rechargeable battery based on a state of charge of the rechargeable battery;
  obtaining a negative electrode polarization voltage of the rechargeable battery based on the open-circuit voltage of the rechargeable battery, a terminal voltage of the rechargeable battery, and a polarization proportion of the rechargeable battery, where the polarization proportion of the rechargeable battery represents a proportion that is of a negative electrode polarization voltage of the rechargeable battery to a polarization voltage of the rechargeable battery and that is obtained when the rechargeable battery is at a lithium plating critical point;
  obtaining a negative electrode voltage of the rechargeable battery based on the negative electrode open-circuit voltage of the rechargeable battery and the negative electrode polarization voltage of the rechargeable battery; and
  determining, based on the negative electrode voltage of the rechargeable battery, whether lithium plating occurs in the rechargeable battery.

The open-circuit voltage of the rechargeable battery and the negative electrode open-circuit voltage of the rechargeable battery are obtained based on the state of charge of the rechargeable battery, further, the negative electrode polarization voltage of the rechargeable battery is obtained based on the open-circuit voltage of the rechargeable battery, the terminal voltage of the rechargeable battery, and the polarization proportion of the rechargeable battery, then, the negative electrode voltage of the rechargeable battery is obtained based on the negative electrode open-circuit voltage of the rechargeable battery and the negative electrode polarization voltage of the rechargeable battery, and finally, whether lithium plating occurs in the rechargeable battery is determined based on the negative electrode voltage of the rechargeable battery. Known parameters required for obtaining the negative electrode voltage of the rechargeable battery are a state of charge, a terminal voltage, and a polarization proportion of the rechargeable battery, and the state of charge, the terminal voltage, and the polarization proportion are easy to obtain without using a reference electrode to obtain the parameters. Therefore, compared with a related technology, the method for detecting lithium plating in a rechargeable battery provided in embodiments of this application can ensure accuracy of the obtained negative electrode voltage, and further ensure accuracy of lithium plating detection for the rechargeable battery.

In addition, parameters such as a state of charge, a terminal voltage, and a polarization proportion that are required for lithium plating detection are easy to obtain, so that the method for detecting lithium plating is easy to implement. In addition, data required for lithium plating detection is data that can be collected by an existing battery management system, and obtaining the data has no additional requirement on sensors for a current, a voltage, and the like. Therefore, the method can be conveniently deployed in the battery management system without increasing hardware costs, so that applicability is high.

In an implementation, the determining, based on the negative electrode voltage of the rechargeable battery, whether lithium plating occurs in the rechargeable battery includes: when the negative electrode voltage of the rechargeable battery is less than a reference voltage threshold, determining that lithium plating occurs in the rechargeable battery.

Optionally, the obtaining a negative electrode polarization voltage of the rechargeable battery based on the open-circuit voltage of the rechargeable battery, a terminal voltage of the rechargeable battery, and a polarization proportion of the rechargeable battery includes: obtaining a polarization voltage of the rechargeable battery based on the open-circuit voltage of the rechargeable battery, the terminal voltage of the rechargeable battery, and a first reference relationship, where the first reference relationship is a relationship among an open-circuit voltage of the rechargeable battery, a terminal voltage of the rechargeable battery, and a polarization voltage of the rechargeable battery; and obtaining the negative electrode polarization voltage of the rechargeable battery based on the polarization voltage of the rechargeable battery and the polarization proportion of the rechargeable battery.

To obtain the negative electrode polarization voltage of the rechargeable battery, the polarization proportion of the rechargeable battery may be pre-calibrated. Optionally, before the obtaining a negative electrode polarization voltage of the rechargeable battery based on the open-circuit voltage of the rechargeable battery, a terminal voltage of the rechargeable battery, and a polarization proportion of the rechargeable battery, the method further includes: obtaining a polarization voltage of a first reference battery when the first reference battery is charged by using a target charging current and is at a lithium plating critical point; obtaining a negative electrode polarization voltage of the first reference battery when the first reference battery is charged by using the target charging current and is at the lithium plating critical point; and obtaining the polarization proportion of the rechargeable battery based on the negative electrode polarization voltage of the first reference battery and the polarization voltage of the first reference battery.

It should be noted that, to ensure accuracy of the polarization proportion of the rechargeable battery, a plurality of polarization proportions may be calibrated by using a plurality of charging currents, and the polarization proportion of the rechargeable battery is calibrated based on the plurality of polarization proportions. For example, an average value of the plurality of polarization proportions may be used as the polarization proportion of the rechargeable battery, or a weighted sum of the plurality of polarization proportions may be used as the polarization proportion of the rechargeable battery. This is not specifically limited in this embodiment of this application.

In a possible implementation, the obtaining a polarization voltage of a first reference battery when the first reference battery is charged by using a target charging current and is at a lithium plating critical point includes: obtaining a state of charge of the first reference battery and a terminal voltage of the first reference battery when the first reference battery is charged by using the target charging current and is at the lithium plating critical point; querying a correspondence between an open-circuit voltage of the first reference battery and a state of charge of the first reference battery based on the state of charge of the first reference battery, to obtain an open-circuit voltage of the first reference battery corresponding to the state of charge of the first reference battery; and obtaining the polarization voltage of the first reference battery based on the open-circuit voltage of the first reference battery, the terminal voltage of the first reference battery, and a second reference relationship, where the second reference relationship is a relationship among an open-circuit voltage of the first reference battery, a terminal voltage of the first reference battery, and a polarization voltage of the first reference battery.

In a possible implementation, the obtaining a negative electrode polarization voltage of the first reference battery when the first reference battery is charged by using the target charging current and is at the lithium plating critical point includes: obtaining the state of charge of the first reference battery and a negative electrode voltage of the first reference battery when the first reference battery is charged by using the target charging current and is at the lithium plating critical point; querying a correspondence between a negative electrode open-circuit voltage of the first reference battery and a state of charge of the first reference battery based on the state of charge of the first reference battery, to obtain a negative electrode open-circuit voltage of the first reference battery; and obtaining the negative electrode polarization voltage of the first reference battery based on the negative electrode open-circuit voltage of the first reference battery, the negative electrode voltage of the first reference battery, and a third reference relationship, where the third reference relationship is a relationship among a negative electrode voltage of the first reference battery, a negative electrode open-circuit voltage of the first reference battery, and a negative electrode polarization voltage of the first reference battery.

The correspondence between an open-circuit voltage of the rechargeable battery and a state of charge of the rechargeable battery reflects a characteristic of the rechargeable battery, and does not change with a current, a voltage, or the like. Therefore the obtaining an open-circuit voltage of the rechargeable battery and a negative electrode open-circuit voltage of the rechargeable battery based on a state of charge of the rechargeable battery includes: querying a correspondence between an open-circuit voltage of the rechargeable battery and a state of charge of the rechargeable battery based on the state of charge of the rechargeable battery, to obtain the open-circuit voltage of the rechargeable battery; and querying a correspondence between a negative electrode open-circuit voltage of the rechargeable battery and a state of charge of the rechargeable battery based on the state of charge of the rechargeable battery, to obtain the negative electrode open-circuit voltage of the rechargeable battery.

Optionally, before the obtaining an open-circuit voltage of the rechargeable battery and a negative electrode open-circuit voltage of the rechargeable battery based on a state of charge of the rechargeable battery, the method further includes: obtaining a correspondence between an open-circuit voltage of the first reference battery and a remaining capacity of the first reference battery based on a charging and discharging test performed on the first reference battery, and obtaining the correspondence between an open-circuit voltage of the rechargeable battery and a state of charge of the rechargeable battery based on the correspondence between an open-circuit voltage of the first reference battery and a remaining capacity of the first reference battery; and/or obtaining a correspondence between an open-circuit voltage of a second reference battery and a remaining capacity of the second reference battery based on a charging and discharging test performed on the second reference battery, and obtaining the correspondence between a negative electrode open-circuit voltage of the rechargeable battery and a state of charge of the rechargeable battery based on the correspondence between an open-circuit voltage of the second reference battery and a remaining capacity of the second reference battery, where a positive electrode material of the second reference battery is the same as a negative electrode material of the first reference battery, and a negative electrode voltage of the second reference battery is constant.

According to another aspect, this application provides an apparatus for lithium plating detection of a rechargeable battery. The apparatus includes: a first obtaining module, configured to obtain an open-circuit voltage of a rechargeable battery and a negative electrode open-circuit voltage of the rechargeable battery based on a state of charge of the rechargeable battery; a second obtaining module, configured to obtain a negative electrode polarization voltage of the rechargeable battery based on the open-circuit voltage of the rechargeable battery, a terminal voltage of the rechargeable battery, and a polarization proportion of the rechargeable battery, where the polarization proportion of the rechargeable battery represents a proportion that is of a negative electrode polarization voltage of the rechargeable battery to a polarization voltage of the rechargeable battery and that is obtained when the rechargeable battery is at a lithium plating critical point; a third obtaining module, configured to obtain a negative electrode voltage of the rechargeable battery based on the negative electrode open-circuit voltage of the rechargeable battery and the negative electrode polarization voltage of the rechargeable battery; and a determining module, configured to determine, based on the negative electrode voltage of the rechargeable battery, whether lithium plating occurs in the rechargeable battery.

Optionally, the determining module is specifically configured to: when the negative electrode voltage of the rechargeable battery is less than a reference voltage threshold, determine that lithium plating occurs in the rechargeable battery.

Optionally, the second obtaining module is specifically configured to: obtain a polarization voltage of the rechargeable battery based on the open-circuit voltage of the rechargeable battery, the terminal voltage of the rechargeable battery, and a first reference relationship, where the first reference relationship is a relationship among an open-circuit voltage of the rechargeable battery, a terminal voltage of the rechargeable battery, and a polarization voltage of the rechargeable battery; and obtain the negative electrode polarization voltage of the rechargeable battery based on the polarization voltage of the rechargeable battery and the polarization proportion of the rechargeable battery.

Optionally, the apparatus further includes: a fourth obtaining module, configured to obtain a polarization voltage of a first reference battery when the first reference battery is charged by using a target charging current and is at a lithium plating critical point; a fifth obtaining module, configured to obtain a negative electrode polarization voltage of the first reference battery when the first reference battery is charged by using the target charging current and is at the lithium plating critical point; and a sixth obtaining module, configured to obtain the polarization proportion of the rechargeable battery based on the negative electrode polarization voltage of the first reference battery and the polarization voltage of the first reference battery.

Optionally, the fourth obtaining module is specifically configured to: obtain a state of charge of the first reference battery and a terminal voltage of the first reference battery when the first reference battery is charged by using the target charging current and is at the lithium plating critical point; query a correspondence between an open-circuit voltage of the first reference battery and a state of charge of the first reference battery based on the state of charge of the first reference battery, to obtain an open-circuit voltage of the first reference battery corresponding to the state of charge of the first reference battery; and obtain the polarization voltage of the first reference battery based on the open-circuit voltage of the first reference battery, the terminal voltage of the first reference battery, and a second reference relationship, where the second reference relationship is a relationship among an open-circuit voltage of the first reference battery, a terminal voltage of the first reference battery, and a polarization voltage of the first reference battery.

Optionally, the fifth obtaining module is specifically configured to: obtain the state of charge of the first reference battery and a negative electrode voltage of the first reference battery when the first reference battery is charged by using the target charging current and is at the lithium plating critical point; query a correspondence between a negative electrode open-circuit voltage of the first reference battery and a state of charge of the first reference battery based on the state of charge of the first reference battery, to obtain a negative electrode open-circuit voltage of the first reference battery corresponding to the state of charge of the first reference battery; and obtain the negative electrode polarization voltage of the first reference battery based on the negative electrode open-circuit voltage of the first reference battery, the negative electrode voltage of the first reference battery, and a third reference relationship, where the third reference relationship is a relationship among a negative electrode voltage of the first reference battery, a negative electrode open-circuit voltage of the first reference battery, and a negative electrode polarization voltage of the first reference battery.

Optionally, the first obtaining module is specifically configured to: query a correspondence between an open-circuit voltage of the rechargeable battery and a state of charge of the rechargeable battery based on the state of charge of the rechargeable battery, to obtain the open-circuit voltage of the rechargeable battery; and query a correspondence between a negative electrode open-circuit voltage of the rechargeable battery and a state of charge of the rechargeable battery based on the state of charge of the rechargeable battery, to obtain the negative electrode open-circuit voltage of the rechargeable battery.

Optionally, the apparatus further includes: a seventh obtaining module, configured to obtain a correspondence between an open-circuit voltage of the first reference battery and a remaining capacity of the first reference battery based on a charging and discharging test performed on the first reference battery, and obtain the correspondence between an open-circuit voltage of the rechargeable battery and a state of charge of the rechargeable battery based on the correspondence between an open-circuit voltage of the first reference battery and a remaining capacity of the first reference battery; and/or the seventh obtaining module is configured to: obtain a correspondence between an open-circuit voltage of a second reference battery and a remaining capacity of the second reference battery based on a charging and discharging test performed on the second reference battery, and obtain the correspondence between a negative electrode open-circuit voltage of the rechargeable battery and a state of charge of the rechargeable battery based on the correspondence between an open-circuit voltage of the second reference battery and a remaining capacity of the second reference battery, where a positive electrode material of the second reference battery is the same as a negative electrode material of the first reference battery, and a negative electrode voltage of the second reference battery is constant.

According to still another aspect, this application provides a method for detecting lithium plating in a rechargeable battery. The method includes: respectively obtaining at least two groups of charging parameters of a rechargeable battery in a same target state of charge in at least two charging processes of the rechargeable battery, where each group of charging parameters includes a charging current of the rechargeable battery and a target voltage of the rechargeable battery, and the target voltage includes a polarization voltage or a terminal voltage; obtaining a correlation between a target voltage and a charging current in the target state of charge based on the at least two groups of charging parameters; and when the correlation does not conform with a specified correlation, determining that lithium plating occurs in the rechargeable battery in a charging process.

The at least two groups of charging parameters of the rechargeable battery in the same target state of charge are obtained in the at least two charging processes of the rechargeable battery, the correlation between a target voltage and a charging current in the target state of charge is obtained based on the at least two groups of charging parameters, and when the correlation does not conform with the specified correlation, it is determined that lithium plating occurs in the rechargeable battery in a charging process. Each group of charging parameters includes a charging current and a target voltage of the rechargeable battery, and the target voltage includes a polarization voltage or a terminal voltage. Because the charging parameters required in the lithium plating detection process are easy to obtain, and no reference electrode needs to be used to obtain the parameters. Therefore, compared with a related technology, the method for detecting lithium plating in a rechargeable battery provided in embodiments of this application can ensure accuracy of an obtained negative electrode voltage, and further ensure accuracy of lithium plating detection performed on a rechargeable battery.

In addition, parameters such as a state of charge, a terminal voltage, and a polarization proportion that are required for lithium plating detection are easy to obtain, so that the method for detecting lithium plating is easy to implement. In addition, data required for lithium plating detection is data that can be collected by an existing battery management system, and obtaining the data has no additional requirement on sensors for a current, a voltage, and the like. Therefore, the method can be conveniently deployed in the battery management system without increasing hardware costs, so that applicability is high.

The two charging processes may both be history charging processes of the rechargeable battery. That is, the at least two groups of charging parameters are all history charging parameters of the rechargeable battery. In this case, it may be detected, based on the at least two groups of charging parameters, whether lithium plating has occurred in the rechargeable battery in a history charging process. By detecting whether lithium plating has occurred in the rechargeable battery, degradation assessment and safety risk prediction may be performed on the rechargeable battery, to provide a use suggestion for the rechargeable battery in a targeted manner, so as to improve safety of using the rechargeable battery.

Alternatively, one of the two charging processes is a current charging process of the rechargeable battery. That is, the at least two groups of charging parameters may include at least one group of charging parameters obtained when the rechargeable battery is charged to the target state of charge in the current charging process of the rechargeable battery. In this case, whether lithium plating occurs in the rechargeable battery in the current charging process may be detected based on the at least two groups of charging parameters. By detecting whether lithium plating occurs in the rechargeable battery in the current charging process, a charging policy may be improved based on a detection result, to improve safety of charging the rechargeable battery.

When the target voltage is a polarization voltage, the respectively obtaining at least two groups of charging parameters of a rechargeable battery in a same target state of charge in at least two charging processes of the rechargeable battery includes: respectively obtaining terminal voltages of the rechargeable battery in the target state of charge in the at least two charging processes of the rechargeable battery; obtaining, based on the target state of charge and a correspondence between an open-circuit voltage of the rechargeable battery and a state of charge of the rechargeable battery, target open-circuit voltages corresponding to the target state of charge; and respectively obtaining polarization voltages of the rechargeable battery in the target state of charge in the at least two charging processes based on the terminal voltages and the target open-circuit voltages that are obtained in the at least two charging processes.

Optionally, before the respectively obtaining at least two groups of charging parameters of a rechargeable battery in a same target state of charge in at least two charging processes of the rechargeable battery, the method further includes: obtaining a correspondence between an open-circuit voltage of a first reference battery and a remaining capacity of the first reference battery based on a charging and discharging test performed on the first reference battery; and obtaining the correspondence between an open-circuit voltage of the rechargeable battery and a state of charge of the rechargeable battery based on the correspondence between an open-circuit voltage of the first reference battery and a remaining capacity of the first reference battery.

Optionally, the specified correlation is obtained based on a target voltage of the rechargeable battery and a charging current less than a reference current threshold of the rechargeable battery that are in the target state of charge in a history charging process.

The specified correlation determined in this manner is a correlation satisfied by the rechargeable battery in an actual charging state when lithium plating does not occur in the rechargeable battery. When whether lithium plating occurs is detected based on the specified correlation, accuracy of lithium plating detection can be further ensured.

According to yet another aspect, this application provides an apparatus for detecting lithium plating in a rechargeable battery. The apparatus includes: a first obtaining module, configured to respectively obtain at least two groups of charging parameters of a rechargeable battery in a same target state of charge in at least two charging processes of the rechargeable battery, where each group of charging parameters includes a charging current of the rechargeable battery and a target voltage of the rechargeable battery, and the target voltage includes a polarization voltage or a terminal voltage; a second obtaining module, configured to obtain a correlation between a target voltage and a charging current in the target state of charge based on the at least two groups of charging parameters; and a determining module, configured to: when the correlation does not conform with a specified correlation, determine that lithium plating occurs in the rechargeable battery in a charging process.

Optionally, the target voltage is a polarization voltage, and the first obtaining module is specifically configured to: respectively obtain terminal voltages of the rechargeable battery in the target state of charge in the at least two charging processes of the rechargeable battery; obtain, based on the target state of charge and a correspondence between an open-circuit voltage of the rechargeable battery and a state of charge of the rechargeable battery, target open-circuit voltages corresponding to the target state of charge; and respectively obtain polarization voltages of the rechargeable battery in the target state of charge in the at least two charging processes based on the terminal voltages and the target open-circuit voltages that are obtained in the at least two charging processes.

Optionally, the apparatus further includes: a third obtaining module, configured to obtain a correspondence between an open-circuit voltage of a first reference battery and a remaining capacity of the first reference battery based on a charging and discharging test performed on the first reference battery. The third obtaining module is configured to obtain the correspondence between an open-circuit voltage of the rechargeable battery and a state of charge of the rechargeable battery based on the correspondence between an open-circuit voltage of the first reference battery and a remaining capacity of the first reference battery.

Optionally, the specified correlation is obtained based on a target voltage of the rechargeable battery and a charging current less than a reference current threshold of the rechargeable battery that are in the target state of charge in a history charging process.

Optionally, the at least two groups of charging parameters include at least one group of charging parameters obtained when the rechargeable battery is charged to the target state of charge in a current charging process of the rechargeable battery.

According to yet still another aspect, this application provides a method for obtaining a polarization proportion of a rechargeable battery. The method for obtaining a polarization proportion of a rechargeable battery includes: obtaining a polarization voltage of a rechargeable battery when the rechargeable battery is charged by using a target charging current and is at a lithium plating critical point; obtaining a negative electrode polarization voltage of the rechargeable battery when the rechargeable battery is charged by using the target charging current and is at the lithium plating critical point; and obtaining a polarization proportion of the rechargeable battery based on the negative electrode polarization voltage of the rechargeable battery and the polarization voltage of the rechargeable battery.

The polarization voltage and the negative electrode polarization voltage of the rechargeable battery obtained when the rechargeable battery is charged by using the target charging current and is at the lithium plating critical point are obtained, and the polarization proportion of the rechargeable battery can be obtained based on the negative electrode polarization voltage and the polarization voltage of the rechargeable battery. This provides an easy implementation of obtaining a polarization proportion of a rechargeable battery.

In an implementable manner, the obtaining a polarization voltage of a rechargeable battery when the rechargeable battery is charged by using a target charging current and is at a lithium plating critical point includes: obtaining a state of charge of the rechargeable battery and a terminal voltage of the rechargeable battery when the rechargeable battery is charged by using the target charging current and is at the lithium plating critical point; obtaining an open-circuit voltage of the rechargeable battery based on the state of charge of the rechargeable battery; and obtaining the polarization voltage of the rechargeable battery based on the open-circuit voltage of the rechargeable battery and the terminal voltage of the rechargeable battery.

The obtaining an open-circuit voltage of the rechargeable battery based on the state of charge of the rechargeable battery includes: obtaining a correspondence between an open-circuit voltage of the rechargeable battery and a state of charge of the rechargeable battery; and querying the correspondence between an open-circuit voltage of the rechargeable battery and a state of charge of the rechargeable battery based on the state of charge of the rechargeable battery, to obtain the open-circuit voltage of the rechargeable battery corresponding to the state of charge of the rechargeable battery.

In an implementable manner, the obtaining a negative electrode polarization voltage of the rechargeable battery when the rechargeable battery is charged by using the target charging current and is at the lithium plating critical point includes: obtaining the state of charge of the rechargeable battery and a negative electrode voltage of the rechargeable battery when the rechargeable battery is charged by using the target charging current and is at the lithium plating critical point; obtaining a negative electrode open-circuit voltage of the rechargeable battery based on the state of charge of the rechargeable battery; and obtaining the negative electrode polarization voltage of the rechargeable battery based on the negative electrode open-circuit voltage of the rechargeable battery and the negative electrode voltage of the rechargeable battery.

The obtaining a negative electrode open-circuit voltage of the rechargeable battery based on the state of charge of the rechargeable battery includes: obtaining a correspondence between a negative electrode open-circuit voltage of the rechargeable battery and a state of charge of the rechargeable battery; and querying the correspondence between a negative electrode open-circuit voltage of the rechargeable battery and a state of charge of the rechargeable battery based on the state of charge of the rechargeable battery, to obtain the negative electrode open-circuit voltage of the rechargeable battery corresponding to the state of charge of the rechargeable battery.

According to still another aspect, this application provides an apparatus for obtaining a polarization proportion of a rechargeable battery. The apparatus for obtaining a polarization proportion of a rechargeable battery includes: a first obtaining module, configured to obtain a polarization voltage of a rechargeable battery when the rechargeable battery is charged by using a target charging current and is at a lithium plating critical point; a second obtaining module, configured to obtain a negative electrode polarization voltage of the rechargeable battery when the rechargeable battery is charged by using the target charging current and is at the lithium plating critical point; and a third obtaining module, configured to obtain a polarization proportion of the rechargeable battery based on the negative electrode polarization voltage of the rechargeable battery and the polarization voltage of the rechargeable battery.

Optionally, the first obtaining module is specifically configured to: obtain a state of charge of the rechargeable battery and a terminal voltage of the rechargeable battery when the rechargeable battery is charged by using the target charging current and is at the lithium plating critical point; obtain an open-circuit voltage of the rechargeable battery based on the state of charge of the rechargeable battery; and obtain the polarization voltage of the rechargeable battery based on the open-circuit voltage of the rechargeable battery and the terminal voltage of the rechargeable battery.

Optionally, the first obtaining module is specifically configured to: obtain a correspondence between an open-circuit voltage of the rechargeable battery and a state of charge of the rechargeable battery; and query the correspondence between an open-circuit voltage of the rechargeable battery and a state of charge of the rechargeable battery based on the state of charge of the rechargeable battery, to obtain the open-circuit voltage of the rechargeable battery corresponding to the state of charge of the rechargeable battery.

Optionally, the second obtaining module is specifically configured to: obtain the state of charge of the rechargeable battery and a negative electrode voltage of the rechargeable battery when the rechargeable battery is charged by using the target charging current and is at the lithium plating critical point; obtain a negative electrode open-circuit voltage of the rechargeable battery based on the state of charge of the rechargeable battery; and obtain the negative electrode polarization voltage of the rechargeable battery based on the negative electrode open-circuit voltage of the rechargeable battery and the negative electrode voltage of the rechargeable battery.

Optionally, the second obtaining module is specifically configured to: obtain a correspondence between a negative electrode open-circuit voltage of the rechargeable battery and a state of charge of the rechargeable battery; and query the correspondence between a negative electrode open-circuit voltage of the rechargeable battery and a state of charge of the rechargeable battery based on the state of charge of the rechargeable battery, to obtain the negative electrode open-circuit voltage of the rechargeable battery corresponding to the state of charge of the rechargeable battery.

According to yet still another aspect, this application provides a computer device. The computer device includes a processor and a memory. The memory stores a computer program. When the processor executes the computer program, the computer device implements the method provided in this application.

According to yet another aspect, this application provides a storage medium. When instructions in the storage medium are executed by a processor, a computer device implements the method provided in this application.

DESCRIPTION OF EMBODIMENTS

Figure 1:
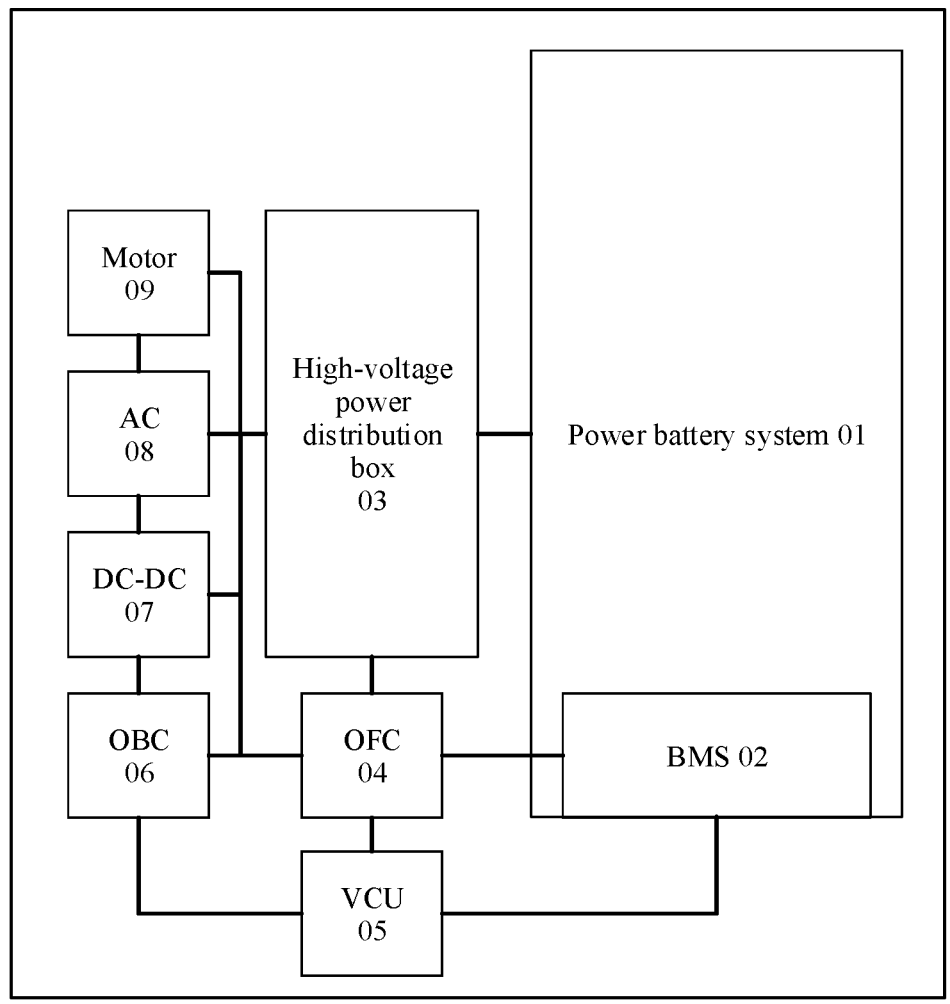
FIG. 1 is a schematic diagram of a structure of a vehicle system of an electric vehicle according to an embodiment of this application.

To make the objectives, technical solutions, and advantages of this application clearer, the following further describes the implementations of this application in detail with reference to the accompanying drawings.

For ease of understanding, the following first explains terms in embodiments of this application.

Lithium plating is a phenomenon that when lithium ions cannot be inserted in a negative electrode equivalently after being extracted from a positive electrode of the battery, the lithium ions that cannot be inserted in the negative electrode of the battery obtain electrons near the negative electrode of the battery, forming a silver-white lithium monomer.

A terminal voltage is a voltage difference between a positive electrode and a negative electrode of a battery.

A positive voltage is a voltage difference between a positive electrode and a reference electric potential. The reference electric potential is usually provided by a reference electrode.

A negative voltage is a voltage difference between a negative electrode and a reference electric potential.

The open-circuit voltage (OCV) is a terminal voltage of a battery in an open circuit state, that is, a terminal voltage obtained when the battery reaches a stable state after not working (no current flows through the battery). The open-circuit voltage depends on a battery capacity. When a rechargeable battery is charged or discharged at a low current rate (for example, a rate ≤1/10), a terminal voltage of the rechargeable battery is approximately equal to an open-circuit voltage of the rechargeable battery.

A positive open-circuit voltage is a voltage difference between a positive electrode and a reference electric potential when a battery is in an open-circuit state.

A negative electrode open-circuit voltage is a voltage difference between a negative electrode and a reference electric potential when a battery is in an open-circuit state.

A polarization voltage is an electrical potential difference generated when electrode electromotive force deviates from an equilibrium electrode potential due to effects such as charge transfer and an ion concentration difference in a working process of a battery. In a calculation process, the polarization voltage may be equal to a voltage difference between a terminal voltage and an open-circuit voltage.

A positive electrode polarization voltage is a voltage difference between a positive terminal voltage and a positive open-circuit voltage.

A negative electrode polarization voltage is a voltage difference between a negative terminal voltage and a negative electrode open-circuit voltage.

A state of health (State of Health, SOH) of a battery is a ratio of a maximum remaining capacity of the battery to a rated capacity of the battery and is usually represented in percentage.

A state of charge (State of Charge, SOC) of a battery is a ratio of a remaining capacity of the battery to a fully-charged capacity of the battery and is usually represented by a percentage. The state of charge may reflect a remaining capacity of the battery.

A battery capacity is represented by a time length for discharging a rechargeable battery based on a current with a specified magnitude. The unit is an ampere hour (Ampere Hour, Ah). A formula for calculating the battery capacity is calculating an integral value of the current over time.

Embodiments of this application provide a method for detecting lithium plating in a rechargeable battery. An open-circuit voltage of a rechargeable battery and a negative electrode open-circuit voltage of the rechargeable battery are obtained based on a state of charge of the rechargeable battery, a negative electrode polarization voltage of the rechargeable battery is obtained based on the open-circuit voltage of the rechargeable battery, a terminal voltage of the rechargeable battery, and a polarization proportion of the rechargeable battery, and then a negative electrode voltage of the rechargeable battery is obtained based on the negative electrode open-circuit voltage of the rechargeable battery and the negative electrode polarization voltage of the rechargeable battery. Finally, whether lithium plating occurs in the rechargeable battery is determined based on the negative electrode voltage of the rechargeable battery.

It can be learned from the foregoing that known parameters required for obtaining a negative electrode voltage of a rechargeable battery are a state of charge, a terminal voltage, and a polarization proportion of the rechargeable battery. The state of charge of the rechargeable battery reflects a remaining capacity of the rechargeable battery, and the state of charge of the rechargeable battery may be obtained based on a charging current of the rechargeable battery. The polarization proportion of the rechargeable battery represents a proportion that is of a negative electrode polarization voltage of the rechargeable battery to a polarization voltage of the rechargeable battery and that is obtained when the rechargeable battery is at a lithium plating critical point, and the polarization proportion of the rechargeable battery reflects performance of the rechargeable battery. The terminal voltage is a voltage difference between a positive electrode and a negative electrode of the rechargeable battery. It can be learned that the state of charge, the terminal voltage, and the polarization proportion are easy to obtain without using a reference electrode to obtain the parameters. Therefore, compared with a related technology, the method for detecting lithium plating in a rechargeable battery provided in embodiments of this application can ensure accuracy of an obtained negative electrode voltage, and further ensure accuracy of lithium plating detection performed on a rechargeable battery. The lithium plating critical point refers to a critical state in which lithium plating occurs or lithium plating does not occur in a rechargeable battery, that is, a state in which a lithium plating degree of the rechargeable battery changes from zero to a positive number.

Scenarios related to the method for detecting lithium plating in a rechargeable battery provided in embodiments of this application may include all scenarios in which a lithium battery is used as a rechargeable battery. For example, the scenario may be an electric vehicle, a mobile terminal, a base station, an energy storage power station, a data center charge power supply, or the like that is charged by using a lithium battery. The method can be applied to a battery management system. The method is deployed in a battery management system, so that the battery management system can detect a lithium plating status of a rechargeable battery by executing the method, and manage the rechargeable battery based on a detection result, to ensure use safety of the rechargeable battery.

In an embodiment of this application, an example in which the scenario is an electric vehicle charged by using a lithium battery is used for description. FIG. 1 is a schematic diagram of a structure of a vehicle system of an electric vehicle. As shown in FIG. 1, a power battery system 01, a battery management system (battery management system, BMS) 02, a high-voltage power distribution box 03, an off-board charger (off-board charger, OFC) 04, a vehicle controller unit (vehicle control unit, VCU) 05, an on-board charger (on-board charger, OBC) 06, a direct current-direct current converter (direct current-direct current converter, DC-DC) 07, an alternating current converter (alternating current converter, AC) 08, and an engine (motor) 09 are disposed on the electric vehicle. The on-board charger is usually an alternating-current charger, and the off-board charger is usually a direct-current charger, that is, a charging pile. The on-board charger and the off-board charger are used together to ensure a charging function of the electric vehicle.

The power battery system includes a rechargeable battery, and the rechargeable battery is used as a power source to supply energy to the vehicle, so as to meet requirements for remaining driving range and power performance of the vehicle. After lithium plating occurs in the rechargeable battery in a charging process, attenuation of a battery capacity accelerates and vehicle safety decreases sharply, resulting in increasing a risk of a short circuit and thermal runaway of the rechargeable battery. The battery management system is used to monitor and manage the power battery system to ensure that the power battery system is in a safe and controllable state.

An application scenario of the method for detecting lithium plating in a rechargeable battery provided in embodiments of this application may include typical working scenarios such as battery charge, battery shelving, and lead profile discharge. Lithium plating detection is performed on a rechargeable battery in the foregoing working scenarios, to help monitor, diagnose, and prevent a safety risk of the rechargeable battery.

For example, in a battery charge scenario, the method provided in embodiments of this application may be used to calculate a real-time negative electrode electrical potential of a rechargeable battery, and determine, based on the real-time negative electrode electrical potential, whether lithium plating occurs in the rechargeable battery. In addition, if it is determined that lithium plating occurs in the rechargeable battery, a charging current may be reduced, so that the rechargeable battery gradually leaves a lithium plating state, or even changes to a safe charge state, to ensure charge safety of the rechargeable battery.

Alternatively, the detection method may be used to predict negative electrode voltages at different charging currents, to predict lithium plating in the rechargeable battery, and formulate a charge policy based on lithium plating prediction, so as to ensure charge safety while improving a charge speed. For example, in a scenario in which a rechargeable battery is quickly charged by using a high-rate current, to avoid lithium plating in the battery, a negative electrode electrical potential safety threshold may be set. Then, a real-time negative electrode electrical potential of the rechargeable battery is calculated by using the method provided in embodiments of this application, and a charging current is adjusted based on the real-time negative electrode electrical potential, so that a charge speed is improved while ensuring that the real-time negative electrode electrical potential is always within the safety threshold. Optionally, when the real-time negative electrode electrical potential is high, a charge rate may be appropriately increased to improve the charge speed. When the real-time negative electrode electrical potential is low, a charge rate can be reduced to improve safety. In addition, a table control manner, or a proportional-integral-derivative (PID) control manner, or the like of multi-step current reduction may be used for a policy of adjusting a charging current.

Alternatively, a degree to which a negative electrode voltage deviates from a reference voltage threshold may be obtained by predicting a negative electrode voltage, and then severity of lithium plating may be obtained. In addition, a start moment and an end moment of lithium plating may be predicted based on negative electrode voltages at different charging currents, and a severity level of lithium plating may be obtained based on the magnitude, the start moment, and the end moment of lithium plating, so that the battery management system maintains the battery based on the severity level, to improve use safety of the battery.

Figure 2:
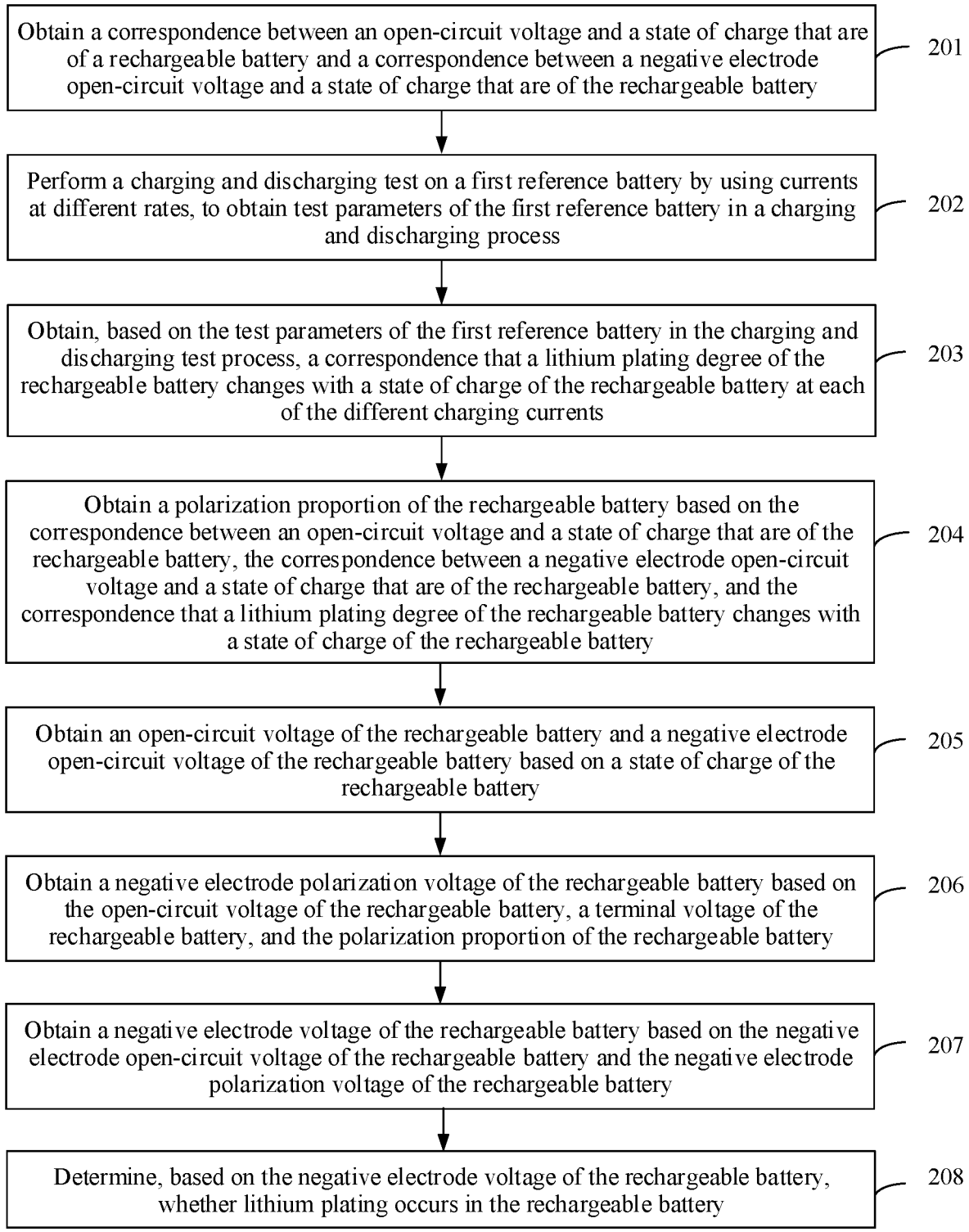
FIG. 2 is a flowchart of a method for detecting lithium plating in a rechargeable battery according to an embodiment of this application.

FIG. 2 is a flowchart of a method for detecting lithium plating in a rechargeable battery according to an embodiment of this application. As shown in FIG. 2, the method includes the following steps.

Step 201: Obtain a correspondence between an open-circuit voltage and a state of charge that are of a rechargeable battery and a correspondence between a negative electrode open-circuit voltage and a state of charge that are of the rechargeable battery.

Figure 3:
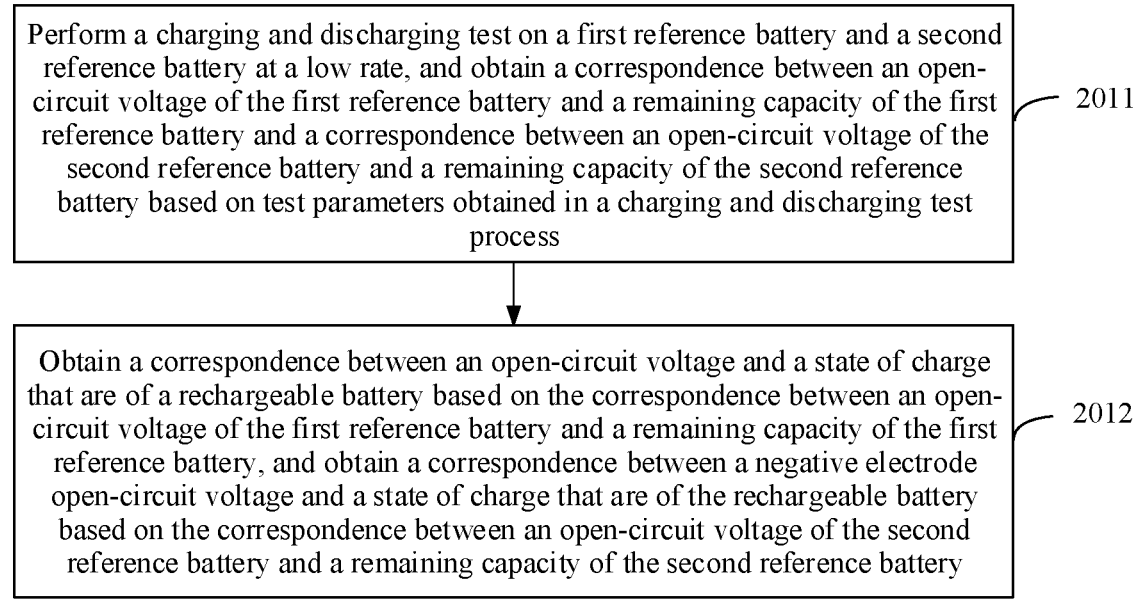
FIG. 3 is a flowchart of a method for obtaining a correspondence between an open-circuit voltage and a state of charge that are of a rechargeable battery and a correspondence between a negative electrode open-circuit voltage and a state of charge that are of the rechargeable battery according to an embodiment of this application.

The correspondence between an open-circuit voltage and a state of charge that are of the rechargeable battery and the correspondence between a negative electrode open-circuit voltage and a state of charge that are of the rechargeable battery may be obtained based on a test parameter obtained in a process of a charging and discharging test performed on the reference battery. For example, the correspondence between an open-circuit voltage and a state of charge that are of the rechargeable battery may be obtained based on a test parameter of a first reference battery, and the correspondence between a negative electrode open-circuit voltage and a state of charge that are of the rechargeable battery may be obtained based on a test parameter of a second reference battery. As shown in FIG. 3, an implementation process is as follows:

Step 2011: Perform a charging and discharging test on the first reference battery and the second reference battery at a low rate, and obtain a correspondence between an open-circuit voltage of the first reference battery and a remaining capacity of the first reference battery and a correspondence between an open-circuit voltage of the second reference battery and a remaining capacity of the second reference battery based on test parameters obtained in a charging and discharging test process.

The test parameters include a real-time charging current, a real-time terminal voltage, and a real-time state of charge. The state of charge reflects the remaining capacity of the first reference battery. The state of charge may be obtained based on a current of the first reference battery. For example, a state of charge is a ratio of a remaining capacity of a battery to a fully-charged capacity of the battery, and the remaining capacity of the battery may be equal to an integral of a current over time.

When the charging and discharging test is performed on the first reference battery and the second reference battery at a low rate, terminal voltages of the first reference battery and the second reference battery each at different test moments may be obtained, and integration of a current of each battery over each test moment is performed, to obtain a battery capacity of a corresponding battery (that is, a remaining capacity of the battery) at each test moment. Then, a correspondence between a terminal voltage of the first reference battery and a remaining capacity of the first reference battery and a correspondence between a terminal voltage of the second reference battery and a remaining capacity of the second reference battery are separately established based on the terminal voltages and remaining capacities of the first reference battery and the second reference battery each at the different test moments. In addition, when a battery is charged or discharged at a low rate (for example, a rate ≤1/10), a terminal voltage of the battery is approximately equal to an open-circuit voltage of the battery. Therefore, the correspondence between a terminal voltage of the first reference battery and a remaining capacity of the first reference battery that is established in the process is the correspondence between an open-circuit voltage of the first reference battery and a remaining capacity of the first reference battery, and the correspondence between a terminal voltage of the second reference battery and a remaining capacity of the second reference battery that is established in the process is the correspondence between an open-circuit voltage of the second reference battery and a remaining capacity of the second reference battery.

It should be noted that, because there is a difference between a charging process and a discharging process, to eliminate impact of the difference on a correspondence between an open-circuit voltage and a remaining capacity, the correspondence between an open-circuit voltage and a remaining capacity may be obtained based on average values of corresponding test parameters in the charging process and the discharging process. In addition, before the charging and discharging test is performed, the first reference battery and the second reference battery may be further stilled for 0 to 10 hours, to ensure that the first reference battery and the second reference battery are in a quasi-equilibrium state, such as electric-thermal-chemical-pressure equilibrium.

In addition, when the correspondence between an open-circuit voltage and a remaining capacity is represented by using a curve, to eliminate or reduce a difference between the first reference battery and the second reference battery, mathematical processing such as curve scaling and curve translation may be further performed on at least one of a curve of an open-circuit voltage of the first reference battery and a remaining capacity of the first reference battery and a curve of an open-circuit voltage of the second reference battery and a remaining capacity of the second reference battery. After the mathematical processing, a technology such as an incremental capacity analysis (incremental capacity analysis, ICA) technology is used to perform characteristic peak alignment on the curve of an open-circuit voltage of the first reference battery and a remaining capacity of the first reference battery and the curve of an open-circuit voltage of the second reference battery and a remaining capacity of the second reference battery, to implement alignment and matching of main characteristic points of the two curves. Then, normalization processing is performed on the matched curves to obtain a correspondence between an open-circuit voltage of the first reference battery and a state of charge of the first reference battery and a correspondence between an open-circuit voltage of the second reference battery and a state of charge of the second reference battery.

It should be further noted that, because an open-circuit voltage and a negative electrode open-circuit voltage are further affected by a temperature and a state of health, a plurality of times of charging and discharging experiments at different temperatures and in different states of health may be further performed on the first reference battery and the second reference battery, and a correspondence between an open-circuit voltage of the first reference battery and a remaining capacity of the first reference battery and a correspondence between an open-circuit voltage of the second reference battery and a remaining capacity of the second reference battery are obtained based on measurement parameters of the plurality of times of charging and discharging experiments.

The second reference battery is manufactured, and the correspondence between a negative electrode open-circuit voltage and a state of charge that are of the rechargeable battery is obtained by using the second reference battery, so that a reference electrode does not need to be added to the first reference battery. Compared with a related technology in which a reference electrode is added to a rechargeable battery to perform lithium plating detection, in embodiments of this application, integrity of the first reference battery is ensured, a detection result is not affected by an unstable factor of the reference electrode, and detection accuracy can be effectively ensured in the manner according to embodiments of this application. In addition, a three-electrode setup including a reference electrode is not applicable to a commercial battery. Therefore, compared with the related technology, in embodiments of this application, an application scope of lithium plating detection can be ensured in a manner in which the second reference battery is used.

Step 2012: Obtain the correspondence between an open-circuit voltage and a state of charge that are of the rechargeable battery based on the correspondence between an open-circuit voltage of the first reference battery and a remaining capacity of the first reference battery, and obtain the correspondence between a negative electrode open-circuit voltage and a state of charge that are of the rechargeable battery based on the correspondence between an open-circuit voltage of the second reference battery and a remaining capacity of the second reference battery.

Because a state of charge of a battery is a ratio of a remaining battery capacity of the battery to a fully-charged capacity of the battery, after a correspondence between an open-circuit voltage of the battery and a remaining capacity of the battery is obtained, a fully-charged capacity of the battery may be obtained first, and then the correspondence between an open-circuit voltage and a remaining capacity is converted into a correspondence between an open-circuit voltage and a state of charge based on the relationship between a remaining capacity and a state of charge.

It should be noted that a positive electrode material of the second reference battery may be the same as a negative electrode material of the first reference battery, and a negative electrode voltage of the second reference battery is constant. In other words, a negative electrode material of the second reference battery is a material that can maintain a stable electrical potential. In this case, an open-circuit voltage of the second reference battery is approximately equal to a negative electrode open-circuit voltage of the first reference battery. Therefore, a correspondence that is between an open-circuit voltage and a state of charge and that is obtained based on the second reference battery may be considered as a correspondence between a negative electrode open-circuit voltage of the first reference battery and a state of charge of the first reference battery. In this way, the correspondence between an open-circuit voltage and a state of charge that are of the rechargeable battery and the correspondence between a negative electrode open-circuit voltage and a state of charge that are of the rechargeable battery are obtained.

For example, the second reference battery may be a button battery, both a positive electrode material of the button battery and a negative electrode material of the first reference battery may be graphite, and a negative electrode material of the button battery may be lithium, a lithium-plated copper wire, a tin-lithium alloy, or the like. In addition, to further ensure reliability and accuracy of an obtained correspondence, a positive electrode material of the button battery may be a material obtained from a negative electrode of the first reference battery after the first reference battery is disassembled. Moreover, to ensure operation safety, battery power of the first reference battery may be fully discharged first, so that the negative electrode material is in a safe state, and a process of assembling the button battery is performed in a glove compartment.

It should be noted that step 201 to step 204 are a preparation process before lithium plating detection, and parameters obtained in the process are all used to detect whether lithium plating occurs in the rechargeable battery. Therefore, each parameter obtained in this process may be referred to as a parameter of the reference battery, or may be referred to as a parameter of the rechargeable battery. For example, the reference battery and the rechargeable battery may be batteries of a same model manufactured by a same manufacturer.

Step 202: Perform a charging and discharging test on the first reference battery by using currents at different rates, to obtain test parameters of the first reference battery in a charging and discharging process.

When the charging and discharging test is performed on the first reference battery by using the currents at different rates, the test parameters of the first reference battery on which the charging and discharging test is performed by using the currents can be obtained, to facilitate analysis on the first reference battery. For example, when a charging and discharging test is performed on the first reference battery by using a current at a low rate (a rate ≤1/10C, where C represents a rated charging current of the first reference battery), an obtained test parameter can be used to obtain a correspondence between an open-circuit voltage of the first reference battery and a state of charge of the first reference battery. The correspondence between an open-circuit voltage and a state of charge reflects a characteristic of the first reference battery, and is mainly related to a material of the first reference battery, and does not change with a current, a voltage, or the like. A charging and discharging test is performed on the first reference battery by using a current at a high rate ((1 to 10)C), to cause lithium plating to occur in the first reference battery to some extent, so as to analyze a characteristic of the first reference battery obtained after lithium plating occurs.

Step 203: Obtain, based on the test parameters of the first reference battery in the charging and discharging test process, a correspondence that a lithium plating degree of the rechargeable battery changes with a state of charge of the rechargeable battery at each of the different charging currents.

Figure 4:
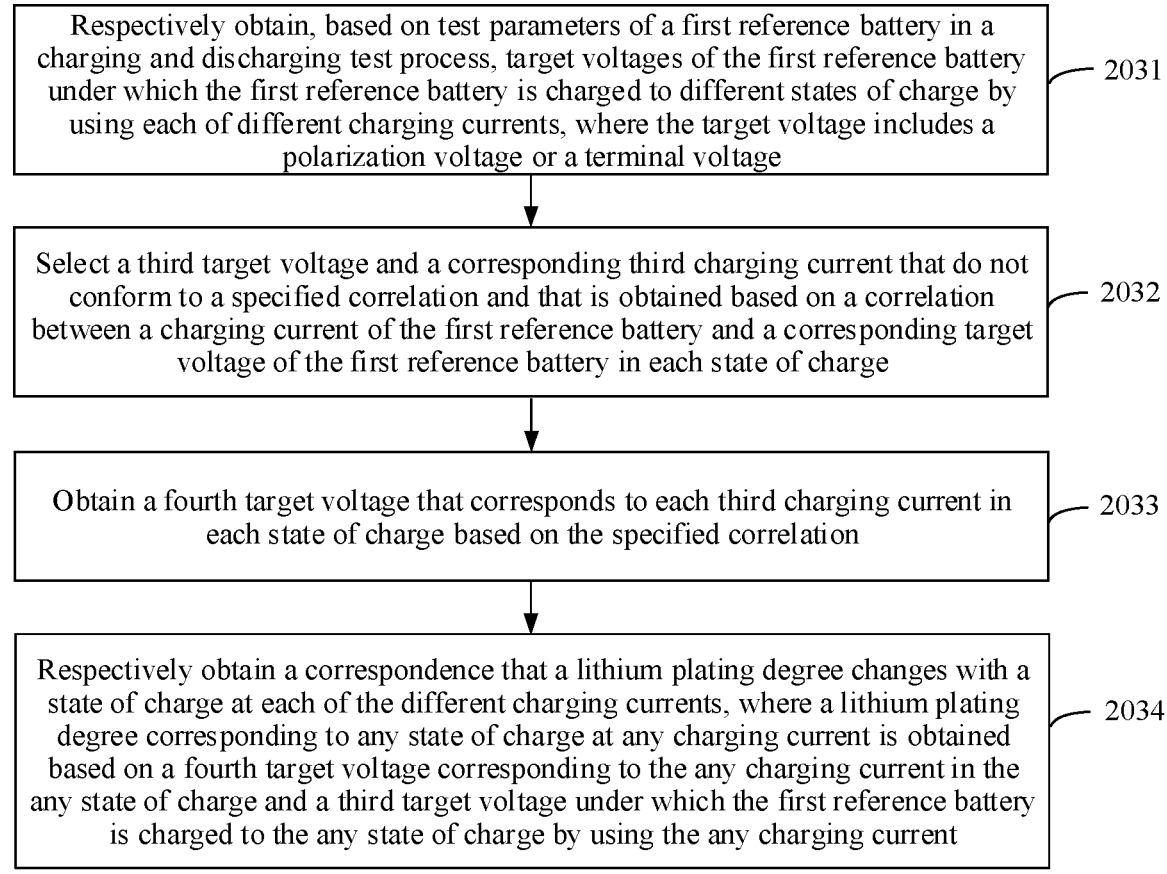
FIG. 4 is a flowchart of a method for obtaining a correspondence that a lithium plating degree of a rechargeable battery changes with a state of charge of the rechargeable battery at each of different charging currents according to an embodiment of this application.
Figure 5:
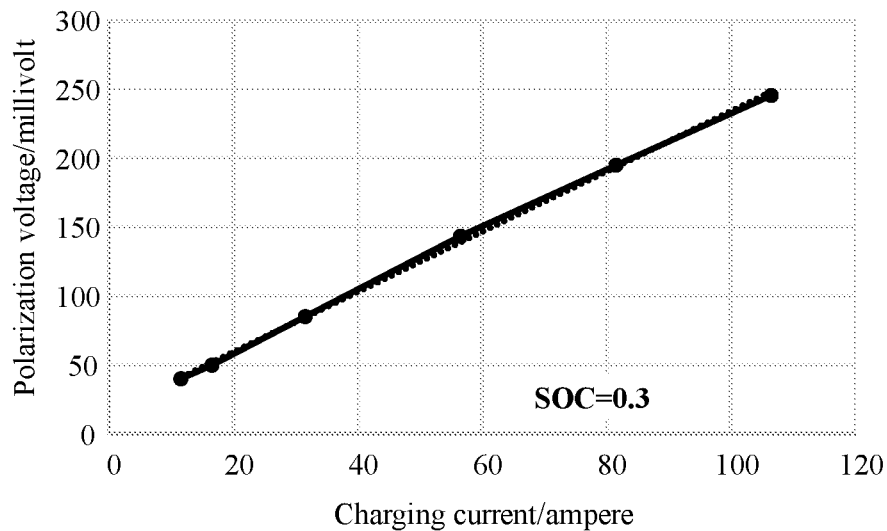
FIG. 5 is a schematic diagram of a curve in which a polarization voltage of a first reference battery changes with a charging current when a state of charge is 0.3 according to an embodiment of this application.
Figure 6:
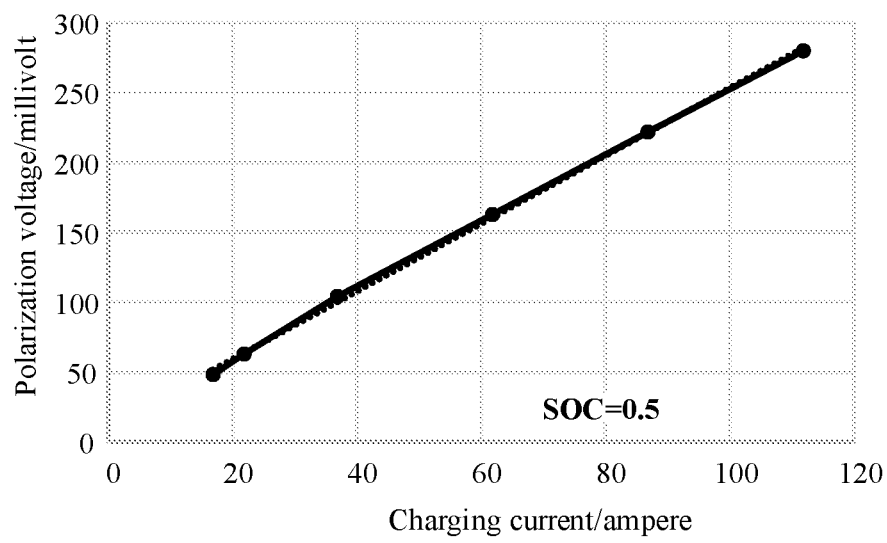
FIG. 6 is a schematic diagram of a curve in which a polarization voltage of a first reference battery changes with a charging current when a state of charge is 0.5 according to an embodiment of this application.

The correspondence that a lithium plating degree of the rechargeable battery changes with a state of charge of the rechargeable battery at each of the different charging currents may be obtained, to facilitate obtaining of a lithium plating critical point of the rechargeable battery. In a possible implementation, as shown in FIG. 4, an implementation process thereof may include the following steps.

Step 2031: Respectively obtain, based on the test parameters of the first reference battery in the charging and discharging test process, target voltages of the first reference battery under which the first reference battery is charged to different states of charge by using each of the different charging currents, where the target voltage includes a polarization voltage or a terminal voltage.

When the target voltage is a terminal voltage, the terminal voltage may be directly obtained through measurement in the charging and discharging test process. To be specific, terminal voltages under which the first reference battery is charged to the different states of charge by using each of the different charging currents may be obtained from the test parameters obtained in step 202. When the target voltage is a polarization voltage, terminal voltages corresponding to the different state of charge at each charging current may be obtained based on the test parameters obtained in step 202, the correspondence between an open-circuit voltage of the first reference battery and a state of charge of the first reference battery obtained in step 201 is queried based on the states of charge, to obtain open-circuit voltages corresponding to the different states of charge at each charging current, and polarization voltages corresponding to the different states of charge at each charging current are obtained based on a known relationship that a polarization voltage is equal to a voltage difference between a terminal voltage and an open-circuit voltage.

Step 2032: Select a third target voltage and a corresponding third charging current that do not conform to a specified correlation and that is obtained based on a correlation between a charging current of the first reference battery and a corresponding target voltage of the first reference battery in each state of charge.

The correlation between a charging current of the first reference battery and a target voltage of the first reference battery in each state of charge may be obtained based on target voltages corresponding to the different states of charges at each charging current. In addition, in each state of charge, if lithium plating does not occur in the first reference battery, a charging current of the first reference battery and a target voltage of the first reference battery may conform to the specified correlation. The third target voltage and the corresponding third charging current that do not conform to the specified correlation in each state of charge may be selected based on the correlation between a charging current of the first reference battery and a target voltage of the first reference battery in each state of charge and the corresponding specified correlation, to perform lithium plating diagnosis based on the third target voltage and the corresponding third charging current.

For example, each of solid lines in FIG. 5 to FIG. 11 represents a curve in which a polarization voltage of the first reference battery changes with a charging current when a state of charge is 0.3, 0.5, 0.6, 0.65, 0.7, 0.75, or 0.8, correlations between the curves are respectively the following: $y=2.1825\times x$, $y=2.4272\times x$, $y=2.3606\times x$, $y=2.4288\times x$, $y=2.5424\times x$, $y=2.7264\times x$, and $y=2.9124\times x$, and fitting rates of the curves are respectively 0.9991, 0.9991, 0.9996, 1, 0.9996, 0.9997, and 0.9999. Each of dotted lines in FIG. 5 to FIG. 11 represents a specified correlation in a corresponding state of charge that is satisfied by a charging current of the first reference battery and a polarization voltage of the first reference battery when lithium plating does not occur.

Figure 7:
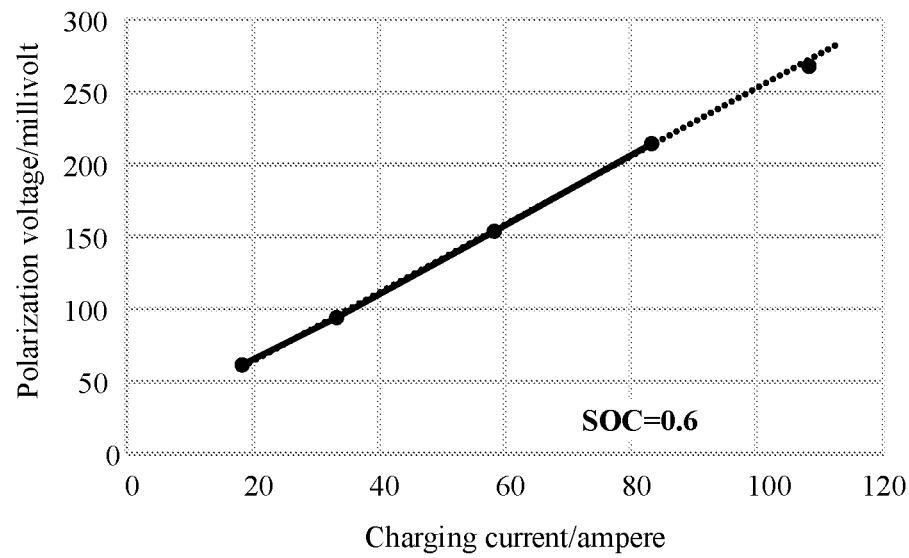
FIG. 7 is a schematic diagram of a curve in which a polarization voltage of a first reference battery changes with a charging current when a state of charge is 0.6 according to an embodiment of this application.
Figure 8:
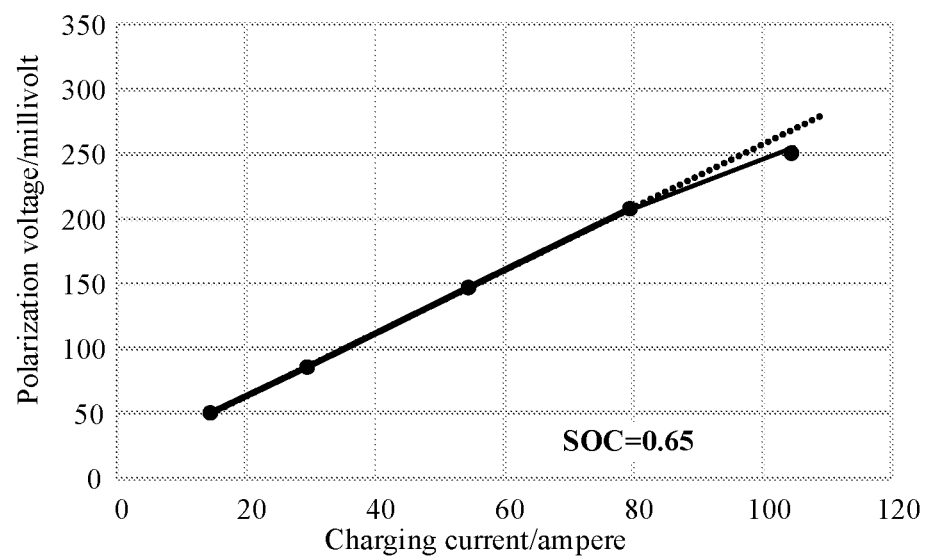
FIG. 8 is a schematic diagram of a curve in which a polarization voltage of a first reference battery changes with a charging current when a state of charge is 0.65 according to an embodiment of this application.
Figure 9:
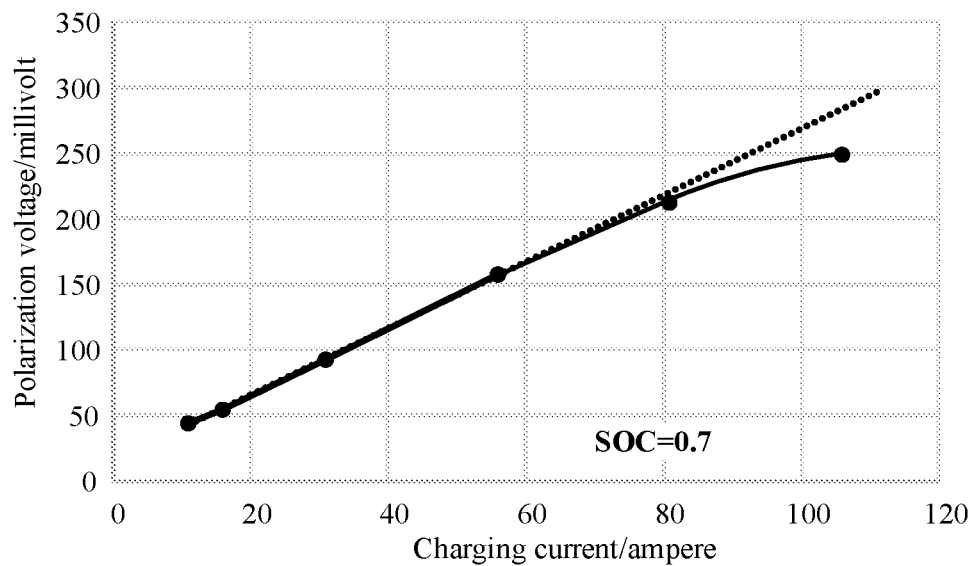
FIG. 9 is a schematic diagram of a curve in which a polarization voltage of a first reference battery changes with a charging current when a state of charge is 0.7 according to an embodiment of this application.
Figure 10:
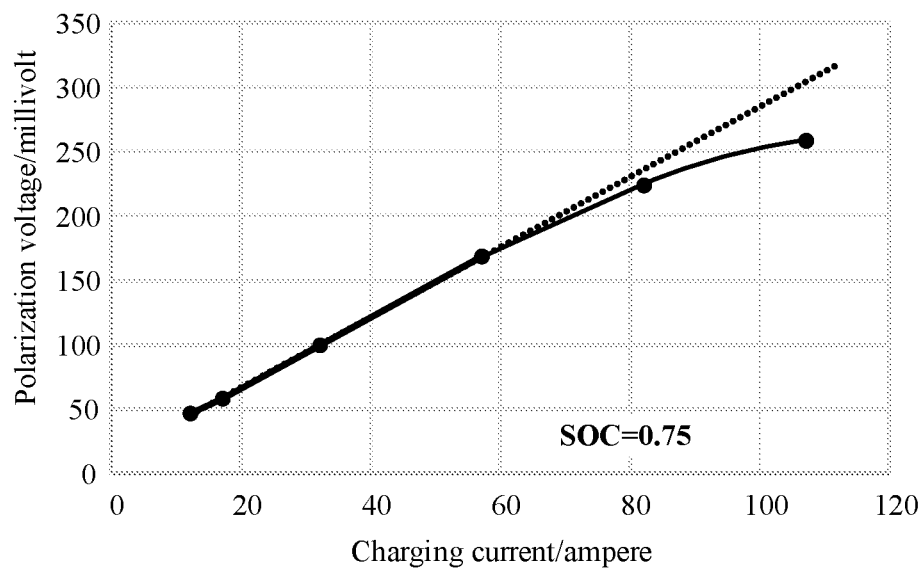
FIG. 10 is a schematic diagram of a curve in which a polarization voltage of a first reference battery changes with a charging current when a state of charge is 0.75 according to an embodiment of this application.
Figure 11:
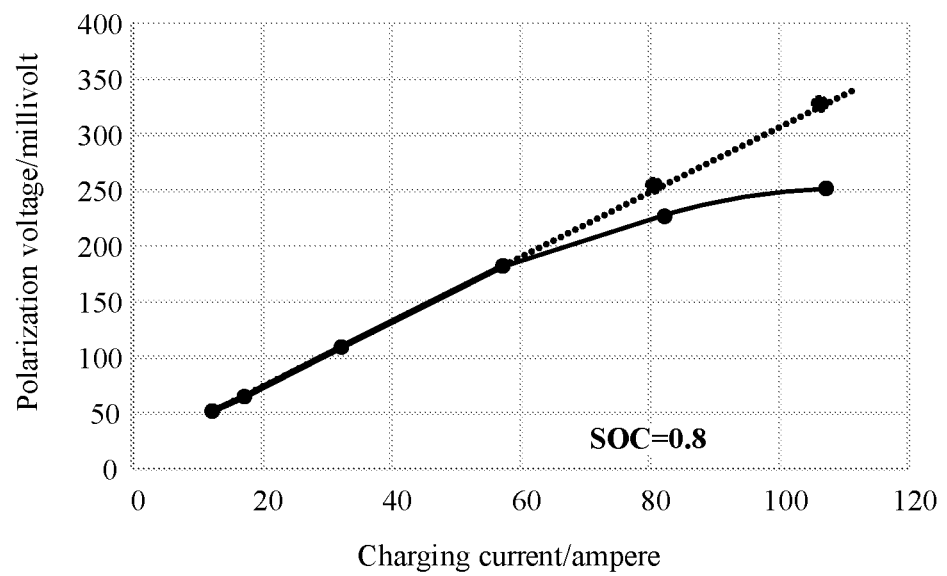
FIG. 11 is a schematic diagram of a curve in which a polarization voltage of a first reference battery changes with a charging current when a state of charge is 0.8 according to an embodiment of this application.

It can be learned from FIG. 7 that when the charging current is increased to 82 amperes (A), the solid line starts to deviate from the dotted line. In this case, when the state of charge is 0.6, charging currents greater than 82 A are all third charging currents that do not conform to the specified correlation, and corresponding polarization voltages are third polarization voltages that do not conform to the correlation. It can be learned from FIG. 8 that when the charging current is increased to 80 A, the solid line starts to deviate from the dotted line. In this case, when the state of charge is 0.65, charging currents greater than 80 A are all third charging currents that do not conform to the specified correlation, and corresponding polarization voltages are third polarization voltages that do not conform to the correlation. It can be learned from FIG. 9 that when the charging current is increased to 76 A, the solid line starts to deviate from the dotted line. In this case, when the state of charge is 0.7, charging currents greater than 76 A are all third charging currents that do not conform to the specified correlation, and corresponding polarization voltages are third polarization voltages that do not conform to the correlation. It can be learned from FIG. 10 that when the charging current is increased to 62 A, the solid line starts to deviate from the dotted line. In this case, when the state of charge is 0.75, charging currents greater than 62 A are all third charging currents that do not conform to the specified correlation, and corresponding polarization voltages are third polarization voltages that do not conform to the correlation. It can be learned from FIG. 11 that when the charging current is increased to 58 A, the solid line starts to deviate from the dotted line. In this case, when the state of charge is 0.8, charging currents greater than 58 A are all third charging currents that do not conform to the specified correlation, and corresponding polarization voltages are third polarization voltages that do not conform to the correlation.

It should be noted that the specified correlation may be a relationship in which impact of an Arrhenius effect of a temperature on a voltage is considered. The correlation between a charging current of the first reference battery and a corresponding target voltage of the first reference battery is obtained based on the test parameters, and the Arrhenius effect of a temperature affects the target voltage in the test process. In other words, the Arrhenius effect of a temperature is also considered in the correlation between a charging current of the first reference battery and a corresponding target voltage of the first reference battery. Therefore, when the Arrhenius effect of a temperature is considered in the specified correlation, and the third target voltage and the corresponding third charging current are selected based on the specified correlation, accuracy of the selected third target voltage and the corresponding third charging current can be ensured.

Step 2033: Obtain a fourth target voltage that corresponds to each third charging current in each state of charge based on the specified correlation.

After the third charging current that does not conform to the specified correlation is determined, the fourth target voltage that corresponds to the third charging current based on the specified correlation may be obtained based on the selected third charging current and the specified correlation. For example, when the specified correlation that is used to select the third charging current is represented by using a mathematical expression y=a×x+b, if the third charging current is c, it may be learned that the fourth target voltage that corresponds to the third charging current based on the specified correlation is a×c+b. Correspondingly, in FIG. 5 to FIG. 11, a point that is on a dotted line segment that does not overlap with the solid line represents a fourth target voltage that corresponds to a third charging current based on the specified correlation.

Step 2034: Separately obtain a correspondence that a lithium plating degree changes with a state of charge at each of the different charging currents, where a lithium plating degree corresponding to any state of charge at any charging current is obtained based on a fourth target voltage corresponding to the any charging current in the any state of charge and a third target voltage under which the first reference battery is charged to the any state of charge by using the any charging current.

In an implementation, a lithium plating degree at any charging current corresponding to any state of charge may be equal to a voltage difference between a fourth target voltage corresponding to the any charging current in the any state of charge and a third target voltage under which the first reference battery is charged to the any state of charge by using the any charging current. Therefore, a lithium plating degree at a corresponding charging current in a corresponding state of charge can be obtained based on the third target voltage selected in step 2032 and the fourth target voltage obtained in step 2033. After lithium plating degrees at the different charging currents in the different states of charge are obtained, the correspondence that the lithium plating degree changes with the state of charge can be obtained by collecting statistics based on each of different charging currents.

Figure 12:
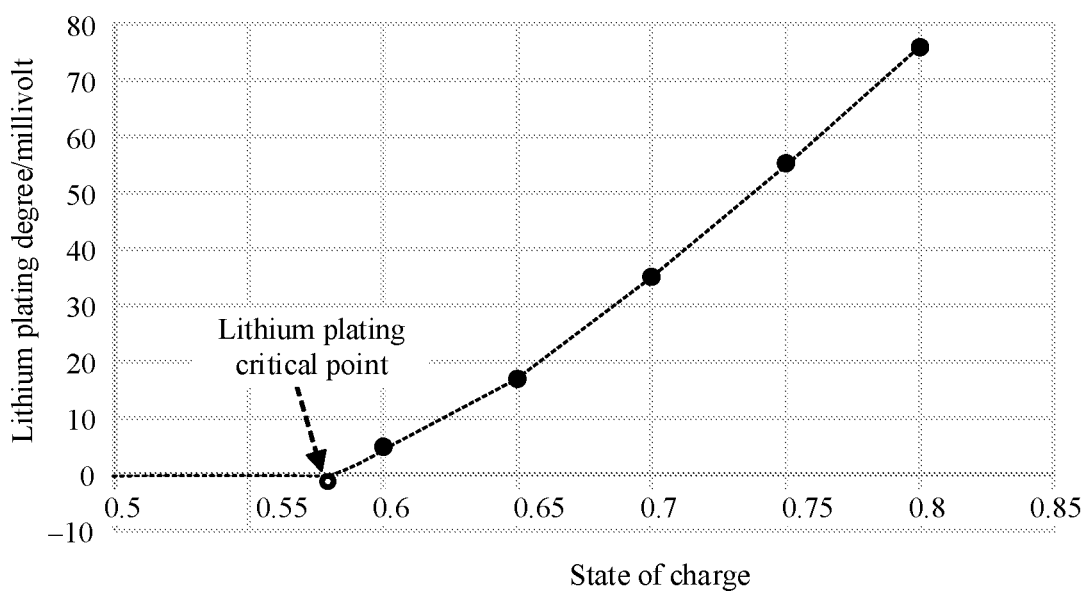
FIG. 12 is a schematic diagram of a correspondence in which a lithium plating degree changes with a state of charge according to an embodiment of this application.

For example, each of FIG. 5 to FIG. 11 shows a correspondence that a polarization voltage changes with a charging current in a specified state of charge. As shown in FIG. 12, when a charging current is 100 A, a correspondence that a lithium plating degree changes with a state of charge may be obtained based on the foregoing correspondence shown in each of FIG. 5 to FIG. 11. It can be seen from FIG. 12 that, when a charging current is 100 A, a lithium plating degree of the rechargeable battery changes from zero to a positive number when a state of charge is 0.58, that is, when the charging current is 100 A, the state of charge of the rechargeable battery at a lithium plating critical point is 0.58. The lithium plating critical point refers to a critical state in which lithium plating occurs or lithium plating does not occur in the rechargeable battery, that is, a state in which a lithium plating degree of the rechargeable battery changes from zero to a positive number.

It should be noted that a correspondence that a lithium plating degree changes with a state of charge also has a guiding significance in a charging process. For example, for a correspondence that a lithium plating degree changes with a state of charge at a specific charging current, a lithium plating critical point at which the charging current is used for charging may be obtained based on the correspondence. In a charging process, before a state of charge of the rechargeable battery reaches a state of charge corresponding to the lithium plating critical point, the charging current may be used to charge the battery, to ensure a charge speed. After the state of charge of the rechargeable battery reaches the state of charge corresponding to the lithium plating critical point, the charging current can be reduced to avoid lithium plating.

Step 204: Obtain a polarization proportion of the rechargeable battery based on the correspondence between an open-circuit voltage and a state of charge that are of the rechargeable battery, the correspondence between a negative electrode open-circuit voltage and a state of charge that are of the rechargeable battery, and the correspondence that a lithium plating degree of the rechargeable battery changes with a state of charge of the rechargeable battery.

The polarization proportion of the rechargeable battery represents a proportion that is of a negative electrode polarization voltage of the rechargeable battery to a polarization voltage of the rechargeable battery and that is obtained when the rechargeable battery is at a lithium plating critical point.

Figure 13:
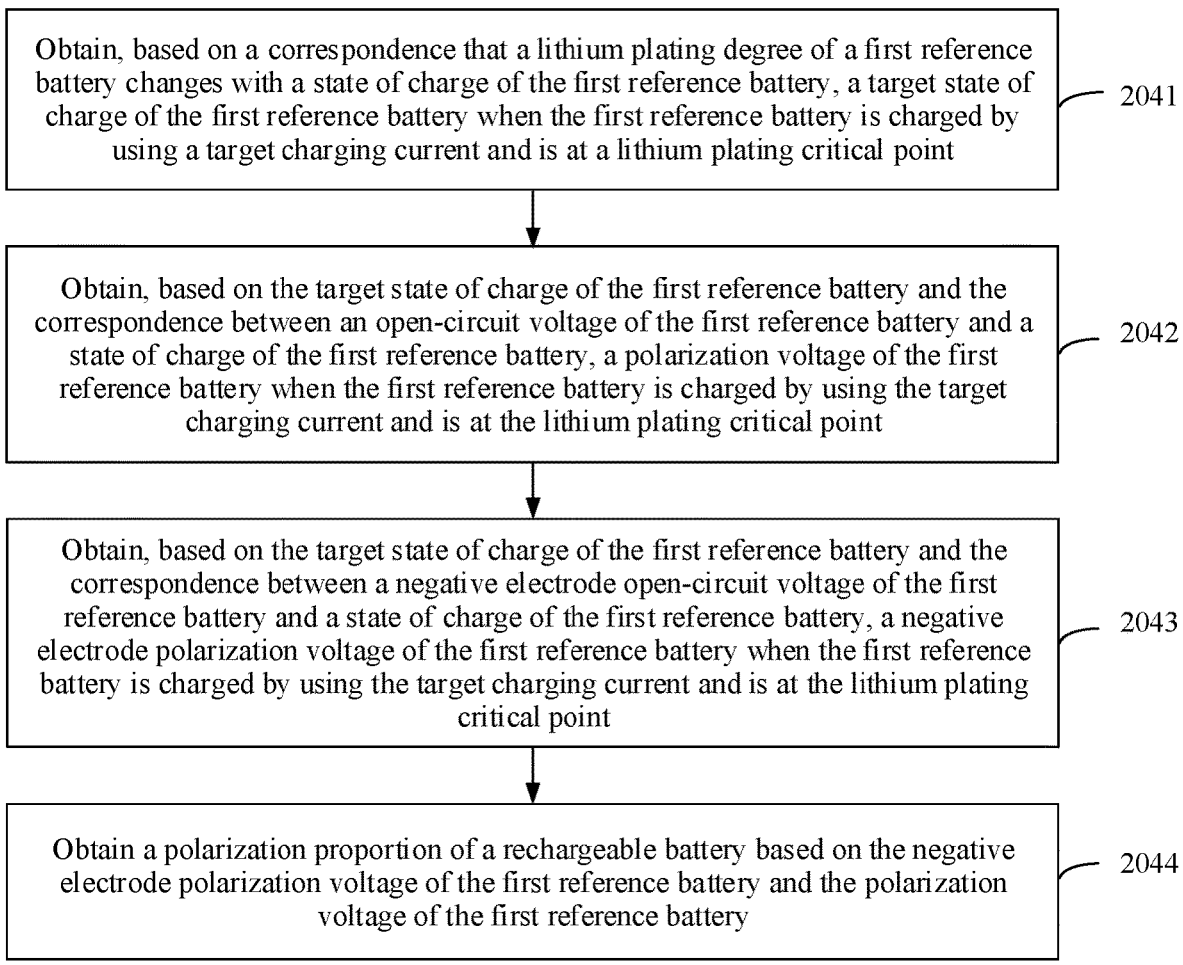
FIG. 13 is a flowchart of a method for obtaining a polarization proportion of a rechargeable battery according to an embodiment of this application.

Optionally, the polarization proportion of the rechargeable battery may be calibrated in advance by using the first reference battery, so that the polarization proportion of the rechargeable battery may be directly used in a lithium plating detection process. The correspondence between an open-circuit voltage and a state of charge that are of the rechargeable battery, the correspondence between a negative electrode open-circuit voltage and a state of charge that are of the rechargeable battery, and the correspondence that a lithium plating degree of the rechargeable battery changes with a state of charge of the rechargeable battery are all applicable to the first reference battery. The following describes an implementation process of step 204 by using an example in which the polarization proportion of the rechargeable battery is calibrated by using the first reference battery. As shown in FIG. 13, the implementation process of step 204 may include the following steps.

Step 2041: Obtain, based on a correspondence that a lithium plating degree of the first reference battery changes with a state of charge of the first reference battery, a target state of charge of the first reference battery when the first reference battery is charged by using a target charging current and is at a lithium plating critical point.

The lithium plating critical point of the first reference battery refers to a critical state in which lithium plating occurs or lithium plating does not occur in the first reference battery, that is, the lithium plating critical point is a state in which a lithium plating degree of the first reference battery changes from zero to a positive number. Therefore, the target state of charge of the first reference battery obtained when the first reference battery is charged by using the target charging current and is at the lithium plating critical point may be obtained based on the correspondence, obtained in step 2034, that a lithium plating degree changes with a state of charge at each of the different charging currents.

Step 2042: Obtain, based on the target state of charge of the first reference battery and the correspondence between an open-circuit voltage of the first reference battery and a state of charge of the first reference battery, a polarization voltage of the first reference battery when the first reference battery is charged by using the target charging current and is at the lithium plating critical point.

Figure 14:
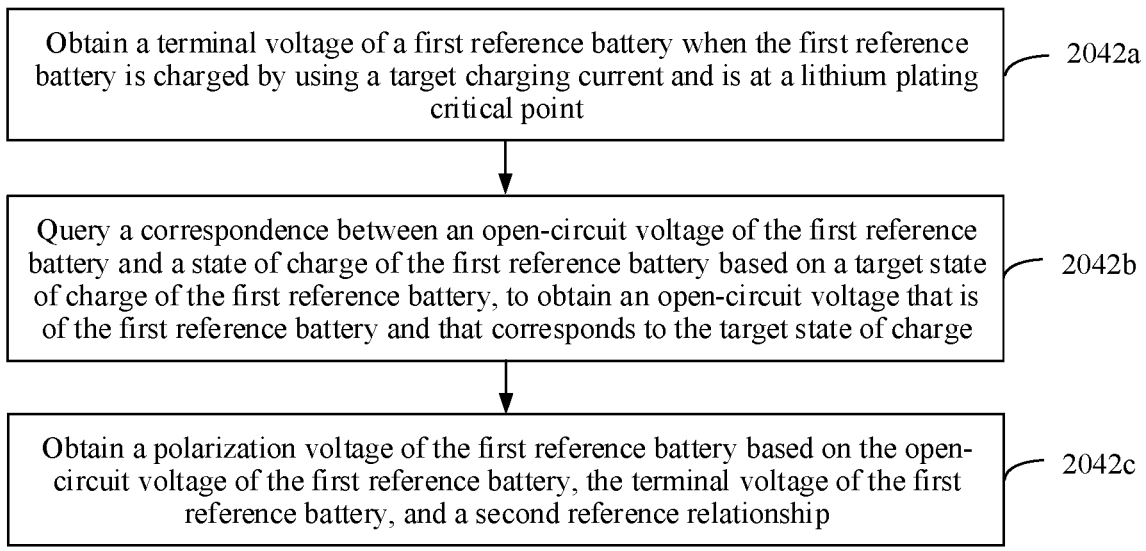
FIG. 14 is a flowchart of a method for obtaining a polarization voltage of a first reference battery when the first reference battery is charged by using a target charging current and is at a lithium plating critical point according to an embodiment of this application.

Optionally, as shown in FIG. 14, an implementation process of step 2042 may include the following steps.

Step 2042*a*: Obtain a terminal voltage of the first reference battery when the first reference battery is charged by using the target charging current and is at the lithium plating critical point.

Terminal voltages of the first reference battery obtained when the first reference battery is charged to states of charge of the first reference battery by using the target charging current may be obtained based on the test parameters obtained in step 202 based on the charging and discharging test performed on the first reference battery.

Step 2042*b*: Query the correspondence between an open-circuit voltage of the first reference battery and a state of charge of the first reference battery based on the target state of charge of the first reference battery, to obtain an open-circuit voltage that is of the first reference battery and that corresponds to the target state of charge.

The correspondence between an open-circuit voltage of the first reference battery and a state of charge of the first reference battery reflects a characteristic of the first reference battery, and does not change with a current, a voltage, or the like. Therefore, after the target state of charge of the first reference battery is obtained, the correspondence between an open-circuit voltage of the first reference battery and a state of charge of the first reference battery may be queried based on the target state of charge, to obtain an open-circuit voltage of the first reference battery in the target state of charge.

Step 2042*c*: Obtain a polarization voltage of the first reference battery based on the open-circuit voltage of the first reference battery, the terminal voltage of the first reference battery, and a second reference relationship.

The second reference relationship refers to a relationship among an open-circuit voltage of the first reference battery, a terminal voltage of the first reference battery, and a polarization voltage of the first reference battery. To be specific, a polarization voltage of the first reference battery is equal to a voltage difference between a terminal voltage of the first reference battery and an open-circuit voltage of the first reference battery. After the open-circuit voltage of the first reference battery and the terminal voltage of the first reference battery are obtained, the polarization voltage of the first reference battery may be obtained based on the second reference relationship.

For example, it is assumed that when the first reference battery is charged by using the target charging current and is at the lithium plating critical point, the terminal voltage of the first reference battery is 4.0 volts (V), and the target state of charge of the first reference battery is 0.58. In addition, the correspondence between an open-circuit voltage and a state of charge of the first reference battery is queried based on the target state of charge, and it may be learned that an open-circuit voltage of the first reference battery corresponding to the target state of charge is 3.74 V. Then, based on the second reference relationship among a terminal voltage, an open-circuit voltage, and a polarization voltage, it may be obtained that the polarization voltage of the first reference battery=the terminal voltage of the first reference battery−the open-circuit voltage of the first reference battery=4.0 V−3.74 V=260 millivolts (mV).

Step 2043: Obtain, based on the target state of charge of the first reference battery and the correspondence between a negative electrode open-circuit voltage of the first reference battery and a state of charge of the first reference battery, a negative electrode polarization voltage of the first reference battery when the first reference battery is charged by using the target charging current and is at the lithium plating critical point.

Figure 15:
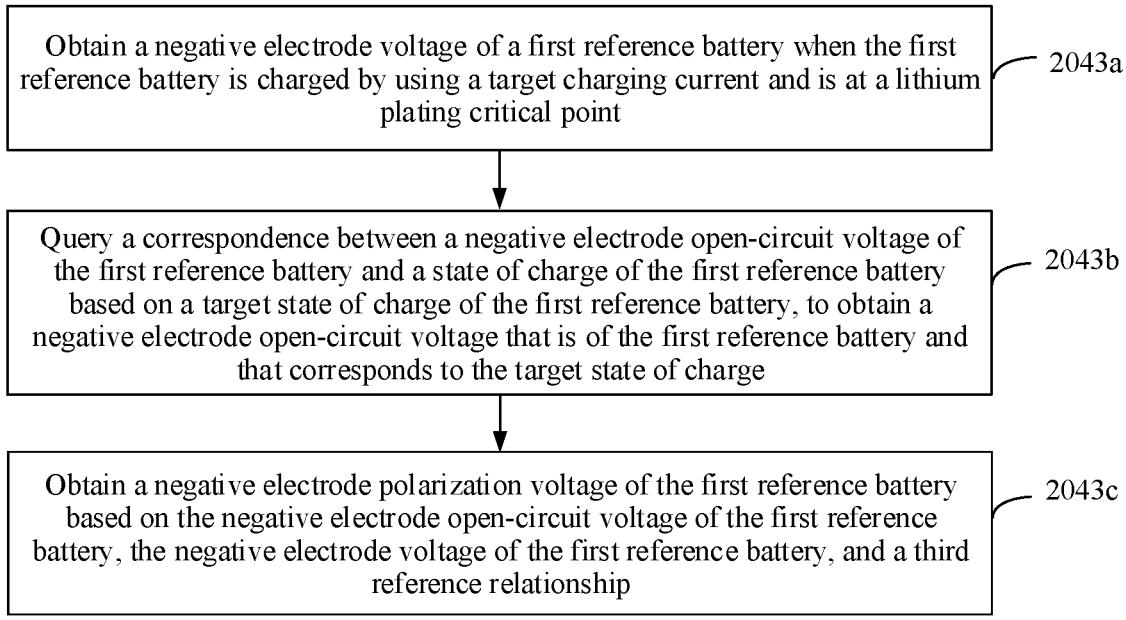
FIG. 15 is a flowchart of a method for obtaining a negative electrode polarization voltage of a first reference battery when the first reference battery is charged by using a target charging current and is at a lithium plating critical point according to an embodiment of this application.

Optionally, as shown in FIG. 15, an implementation process of step 2043 includes the following steps.

Step 2043*a*: Obtain a negative electrode voltage of the first reference battery when the first reference battery is charged by using the target charging current and is at the lithium plating critical point.

Based on a characteristic of a battery at a lithium plating critical point that a negative electrode voltage of the battery is 0 mV, it may be learned that when the first reference battery is charged by using the target charging current and is at the lithium plating critical point, the negative electrode voltage of the first reference battery is 0 mV.

Step 2043*b*: Query the correspondence between a negative electrode open-circuit voltage of the first reference battery and a state of charge of the first reference battery based on the target state of charge of the first reference battery, to obtain a negative electrode open-circuit voltage that is of the first reference battery and that corresponds to the target state of charge.

The correspondence between a negative electrode open-circuit voltage of the first reference battery and a state of charge of the first reference battery reflects a characteristic of the first reference battery, and does not change with a current, a voltage, or the like. Therefore, after the target state of charge of the first reference battery is obtained, the correspondence between a negative electrode open-circuit voltage of the first reference battery and a state of charge of the first reference battery may be queried based on the target state of charge, to obtain a negative electrode open-circuit voltage of the first reference battery in the target state of charge.

Step 2043c: Obtain a negative electrode polarization voltage of the first reference battery based on the negative electrode open-circuit voltage of the first reference battery, the negative electrode voltage of the first reference battery, and a third reference relationship.

The third reference relationship refers to a relationship among a negative electrode open-circuit voltage of the first reference battery, a negative electrode voltage of the first reference battery, and a negative electrode polarization voltage of the first reference battery. To be specific, the negative electrode polarization voltage of the first reference battery is equal to a voltage difference between the negative electrode voltage of the first reference battery and the negative electrode open-circuit voltage of the first reference battery. After the negative electrode open-circuit voltage of the first reference battery and the negative electrode voltage of the first reference battery are obtained, the negative electrode polarization voltage of the first reference battery may be obtained based on the third reference relationship.

For example, it is assumed that when the first reference battery is charged by using the target charging current and is at the lithium plating critical point, the negative electrode voltage of the first reference battery is 0 mV, and the target state of charge of the first reference battery is 0.58. In addition, the correspondence between a negative electrode open-circuit voltage and a state of charge that are of the first reference battery is queried based on the target state of charge, and it may be learned that the negative electrode open-circuit voltage of the first reference battery corresponding to the target state of charge is 109.9 mV. Then, based on the third reference relationship among a negative electrode voltage, a negative electrode open-circuit voltage, and a negative electrode polarization voltage, it may be obtained that the negative electrode polarization voltage of the first reference battery=the negative electrode voltage of the first reference battery−the negative electrode open-circuit voltage of the first reference battery=0 mV−109.9 mV=−109.9 mV.

In addition, because a polarization voltage of a battery is equal to a sum of a negative electrode polarization voltage and a positive electrode polarization voltage, after the polarization voltage of the first reference battery and the negative electrode polarization voltage of the first reference battery are obtained, a positive electrode polarization voltage of the first reference battery can be further obtained. Therefore, according to the method provided in this embodiment of this application, the positive electrode polarization voltage of the first reference battery and the negative electrode polarization voltage of the first reference battery can be separately obtained, to decompose the positive electrode polarization voltage and the negative electrode polarization voltage.

In addition, it can be learned from the above that the method for decomposing the positive electrode polarization voltage and the negative electrode polarization voltage is simple and reliable. When a BMS is used to implement the method for detecting lithium plating in a rechargeable battery provided in this embodiment of this application, a hardware structure of the existing BMS does not need to be changed, and embedded deployment is easy to implement, development of many functions of the BMS can be supported, so that there is a wide application prospect. In addition, a process of decomposing the positive electrode polarization voltage and the negative electrode polarization voltage may be implemented in a process in which the rechargeable battery is not charged, or may be implemented in a process in which the rechargeable battery is charged. The process can support a plurality of two-way application scenarios. In addition, the method for decomposing the positive electrode polarization voltage and the negative electrode polarization voltage can be further used to develop other functions of the BMS, such as formulating a quick charging policy, determining a root cause of battery degradation, and qualitatively analyzing a case in which polarization impedance of each part of a positive electrode and a negative electrode of a battery changes with battery degradation, which has important application value and space.

Step 2044: Obtain the polarization proportion of the rechargeable battery based on the negative electrode polarization voltage of the first reference battery and the polarization voltage of the first reference battery.

The polarization proportion of the rechargeable battery represents a proportion that is of a negative electrode polarization voltage of the rechargeable battery to a polarization voltage of the rechargeable battery and that is obtained when the rechargeable battery is at a lithium plating critical point. Therefore, it may be obtained that the polarization proportion of the rechargeable battery is equal to a ratio of the negative electrode polarization voltage of the first reference battery to the polarization voltage of the first reference battery. Still refer to the examples in step 2042c and step 2043c. It may be obtained that the polarization proportion of the rechargeable battery=the negative electrode polarization voltage of the first reference battery/the polarization voltage of the first reference battery=−109.9 mV/260 mV=−0.4227.

It should be noted that, to ensure accuracy of the polarization proportion of the rechargeable battery, a plurality of polarization proportions may be obtained by using a plurality of charging currents based on the foregoing step 2041 to step 2044, and the polarization proportion of the rechargeable battery is obtained based on the plurality of polarization proportions. For example, an average value of the plurality of polarization proportions may be used as the polarization proportion of the rechargeable battery, or a weighted sum of the plurality of polarization proportions may be used as the polarization proportion of the rechargeable battery. This is not specifically limited in this embodiment of this application.

Step 205: Obtain an open-circuit voltage of the rechargeable battery and a negative electrode open-circuit voltage of the rechargeable battery based on the state of charge of the rechargeable battery.

When it is detected whether lithium plating occurs in the rechargeable battery, a current state of charge of the rechargeable battery may be obtained first, and an open-circuit voltage of the rechargeable battery and a negative electrode open-circuit voltage of the rechargeable battery in the state of charge of the rechargeable battery are obtained based on the state of charge of the rechargeable battery.

The state of charge of the rechargeable battery may be obtained based on a charging current of the rechargeable battery. For example, an integral of a charging current over charging time may be calculated to obtain a remaining capacity of the rechargeable battery, a capacity of the rechargeable battery is obtained when the rechargeable battery is fully charged, and a ratio of the remaining capacity of the rechargeable battery to the capacity of the rechargeable battery obtained when the rechargeable battery is fully charged is used as the state of charge of the rechargeable battery.

In addition, the correspondence between an open-circuit voltage and a state of charge that are of the rechargeable battery reflects a characteristic of the rechargeable battery, and does not change with a current, a voltage, or the like.

Therefore, after the state of charge of the rechargeable battery is obtained, the correspondence between an open-circuit voltage and a state of charge that are of the rechargeable battery may be queried based on the state of charge of the rechargeable battery, to obtain the open-circuit voltage of the rechargeable battery in the state of charge of the rechargeable battery. Similarly, the correspondence between a negative electrode open-circuit voltage and a state of charge that are of the rechargeable battery may be queried based on the state of charge of the rechargeable battery, to obtain the negative electrode open-circuit voltage of the rechargeable battery in the state of charge of the rechargeable battery.

Step 206: Obtain a negative electrode polarization voltage of the rechargeable battery based on the open-circuit voltage of the rechargeable battery, a terminal voltage of the rechargeable battery, and the polarization proportion of the rechargeable battery.

Figure 16:
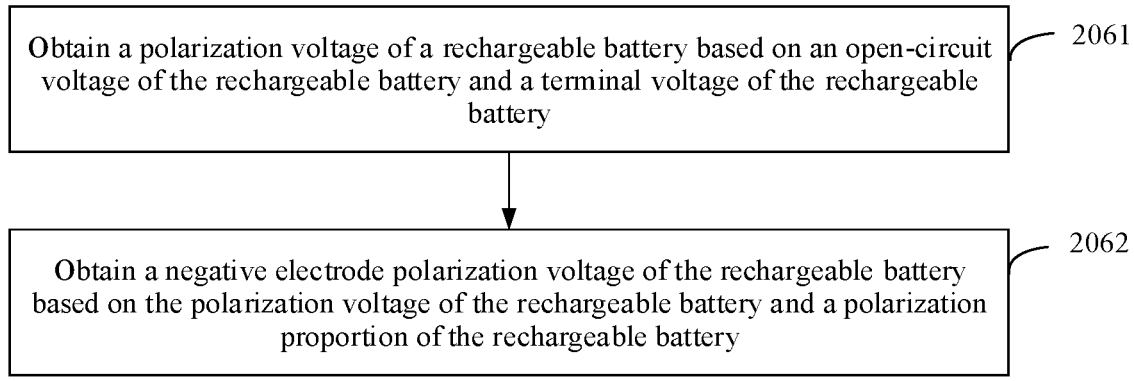
FIG. 16 is a flowchart of a method for obtaining a negative electrode polarization voltage of a rechargeable battery according to an embodiment of this application.

Optionally, as shown in FIG. 16, an implementation process of step 206 may include the following steps.

Step 2061: Obtain a polarization voltage of the rechargeable battery based on the open-circuit voltage of the rechargeable battery and the terminal voltage of the rechargeable battery.

Because there is a first reference relationship among the open-circuit voltage, the terminal voltage, and the polarization voltage that are of the rechargeable battery, after the open-circuit voltage and the terminal voltage that are of the rechargeable battery are obtained, the polarization voltage of the rechargeable battery may be obtained based on the first reference relationship. For example, the first reference relationship may be: polarization voltage=terminal voltage−open-circuit voltage.

Step 2062: Obtain the negative electrode polarization voltage of the rechargeable battery based on the polarization voltage of the rechargeable battery and the polarization proportion of the rechargeable battery.

Because the polarization proportion of the rechargeable battery represents a proportion that is of a negative electrode polarization voltage of the rechargeable battery to a polarization voltage of the rechargeable battery and that is obtained when the rechargeable battery is at a lithium plating critical point, it may be learned that the negative electrode polarization voltage of the rechargeable battery should be equal to a product of the polarization voltage of the rechargeable battery and the polarization proportion of the rechargeable battery.

Step 207: Obtain a negative electrode voltage of the rechargeable battery based on the negative electrode open-circuit voltage of the rechargeable battery and the negative electrode polarization voltage of the rechargeable battery.

Because there is a fourth reference relationship among the negative electrode open-circuit voltage, the negative electrode polarization voltage, and the negative electrode voltage that are of the rechargeable battery, after the negative electrode open-circuit voltage of the rechargeable battery and the negative electrode polarization voltage of the rechargeable battery are obtained, the negative electrode voltage of the rechargeable battery may be obtained based on the fourth reference relationship. For example, the fourth reference relationship may be as follows: The negative electrode polarization voltage of the rechargeable battery is equal to a difference between the negative electrode voltage of the rechargeable battery and the negative electrode open-circuit voltage of the rechargeable battery. Therefore, the negative electrode voltage of the rechargeable battery is equal to a sum of the negative electrode open-circuit voltage of the rechargeable battery and the negative electrode polarization voltage of the rechargeable battery.

It should be noted that step 205 to step 207 may be implemented by using a lithium plating model, and the lithium plating model satisfies:

$$\begin{cases} SOC = \int Idt/Q \\ V_{neg}(SOC) = OCV_{neg}(SOC) + V_{p,neg}(SOC) = \\ OCV_{neg}(SOC) + \alpha \times (V_{cell} - OCV_{cell}(SOC)) \end{cases}$$

I is a charging current of the rechargeable battery, t is a charging time period of the rechargeable battery, Q is battery power obtained when the rechargeable battery is fully charged, SOC is a state of charge of the rechargeable battery obtained after the rechargeable battery is charged for the charging time period t by using the charging current I, $V_{neg}(SOC)$ is a negative electrode voltage of the rechargeable battery under the SOC, $OCV_{neg}(SOC)$ is a negative electrode open-circuit voltage corresponding to the SOC, $V_{p,neg}(SOC)$ is a negative electrode polarization voltage of the rechargeable battery under the SOC, α is a polarization proportion of the rechargeable battery, $V_{cell}$ is a terminal voltage of the rechargeable battery, and $OCV_{cell}(SOC)$ is an open-circuit voltage corresponding to the SOC.

It should be noted that the lithium plating model is an expression when an open-circuit voltage and a negative electrode open-circuit voltage are affected by a state of charge. When an open-circuit voltage and a negative electrode open-circuit voltage are further affected by factors such as a state of health of the rechargeable battery and a temperature, an expression of the open-circuit voltage and the negative electrode open-circuit voltage may be an expression about factors such as a state of charge, a state of health, and a temperature. Correspondingly, the correspondence between an open-circuit voltage and a state of charge obtained in step 201 should be a correspondence between an open-circuit voltage and factors such as a state of charge, a state of health, and a temperature, and the correspondence between a negative electrode open-circuit voltage and a state of charge should be a correspondence between a negative electrode open-circuit voltage and factors such as a state of charge, a state of health, and a temperature.

It can be learned from the lithium plating model that a parameter that needs to be calibrated in the lithium plating model is a polarization proportion. Compared with a related lithium plating detection technology, for example, an electrochemical mechanism model in which each physical parameter and electrochemical parameter (such as electrode porosity, electrode initial embedding amount, and electrode solid-state diffusion coefficient) need to be calibrated, fewer parameters need to be calibrated in the lithium plating model, effectively reducing implementation difficulty of lithium plating detection.

Step 208: Determine, based on the negative electrode voltage of the rechargeable battery, whether lithium plating occurs in the rechargeable battery.

Theoretically, when a negative electrode voltage of the rechargeable battery is less than a reference voltage threshold, it may be considered that a lithium plating condition of the rechargeable battery is activated, that is, lithium plating occurs in the rechargeable battery under this condition. When the negative electrode voltage of the rechargeable battery is greater than the reference voltage threshold, it may be considered that a lithium plating condition of the rechargeable battery is suppressed, that is, lithium plating does not occur in the rechargeable battery under this condition. Therefore, an implementation of determining, based on the negative electrode voltage of the rechargeable battery, whether lithium plating occurs in the rechargeable battery may include: when the negative electrode voltage of the rechargeable battery is less than the reference voltage threshold, determining that lithium plating occurs in the rechargeable battery.

Figure 17:
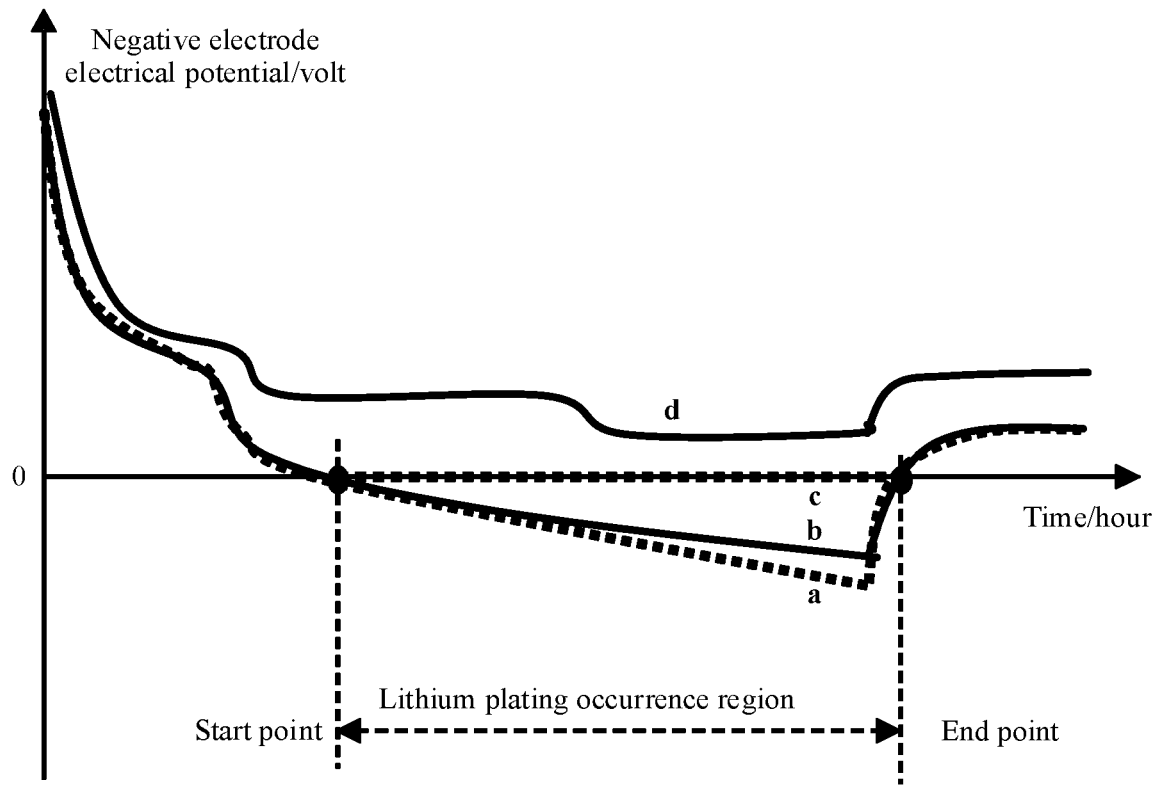
FIG. 17 is a schematic diagram of a principle of lithium plating in a rechargeable battery in a charging process according to an embodiment of this application.

FIG. 17 is a schematic diagram of a principle of lithium plating in a charging process of a rechargeable battery whose positive electrode is made of lithium metal and negative electrode is made of graphite. As shown in FIG. 17, a curve a is an electrical potential of the negative electrode relative to the lithium metal obtained when lithium plating does not occur in the rechargeable battery and only a polarization effect occurs, a curve b is an electrical potential of the negative electrode relative to the lithium metal obtained when partial lithium plating occurs in the rechargeable battery, a curve c is an electrical potential of the negative electrode relative to the lithium metal obtained when 100% lithium plating occurs in the rechargeable battery, that is, all lithium ions from the positive electrode participate in lithium plating on the negative electrode, and no lithium ion is embedded in the graphite, and a curve d is an electrical potential of the negative electrode relative to the lithium metal during normal charging of the rechargeable battery. It can be learned from FIG. 17 that, when lithium plating occurs in the rechargeable battery, an absolute value of a negative electrode voltage of the rechargeable battery decreases. Therefore, whether lithium plating occurs in the rechargeable battery may be detected by comparing the negative electrode voltage of the rechargeable battery with a reference voltage threshold.

The reference voltage threshold is a critical value of the negative electrode voltage when lithium plating occurs or lithium plating does not occur in the rechargeable battery. A value of the reference voltage threshold may be obtained based on a parameter of the rechargeable battery. For example, based on a battery chemical characteristic and a battery structure of the rechargeable battery, it may be obtained that the value of the reference voltage threshold may be 0. The battery chemical characteristic may be represented by a positive electrode material, a negative electrode material, an electrolytic solution material, and the like of the battery, and the battery structure may be represented by a material characteristic of the battery, porosity, a nucleation dynamics characteristic of lithium metal, and the like.

In conclusion, according to the method for detecting lithium plating in a rechargeable battery provided in this embodiment of this application, the open-circuit voltage of the rechargeable battery and the negative electrode open-circuit voltage of the rechargeable battery are obtained based on the state of charge of the rechargeable battery, further, the negative electrode polarization voltage of the rechargeable battery is obtained based on the open-circuit voltage of the rechargeable battery, the terminal voltage of the rechargeable battery, and the polarization proportion of the rechargeable battery, then, the negative electrode voltage of the rechargeable battery is obtained based on the negative electrode open-circuit voltage of the rechargeable battery and the negative electrode polarization voltage of the rechargeable battery, and finally, whether lithium plating occurs in the rechargeable battery is determined based on the negative electrode voltage of the rechargeable battery. Known parameters required for obtaining the negative electrode voltage of the rechargeable battery are a state of charge, a terminal voltage, and a polarization proportion of the rechargeable battery, and the state of charge, the terminal voltage, and the polarization proportion are easy to obtain without using a reference electrode to obtain the parameters. Therefore, compared with a related technology, the method for detecting lithium plating in a rechargeable battery provided in this embodiment of this application can ensure accuracy of the obtained negative electrode voltage, and further ensure accuracy of lithium plating detection for the rechargeable battery.

In addition, parameters such as a state of charge, a terminal voltage, and a polarization proportion that are required for lithium plating detection are easy to obtain, so that the method for detecting lithium plating is easy to implement. In addition, data required for lithium plating detection is data that can be collected by an existing battery management system, and obtaining the data has no additional requirement on sensors for a current, a voltage, and the like. Therefore, the method can be conveniently deployed in the battery management system without increasing hardware costs, so that applicability is high.

Figure 18:
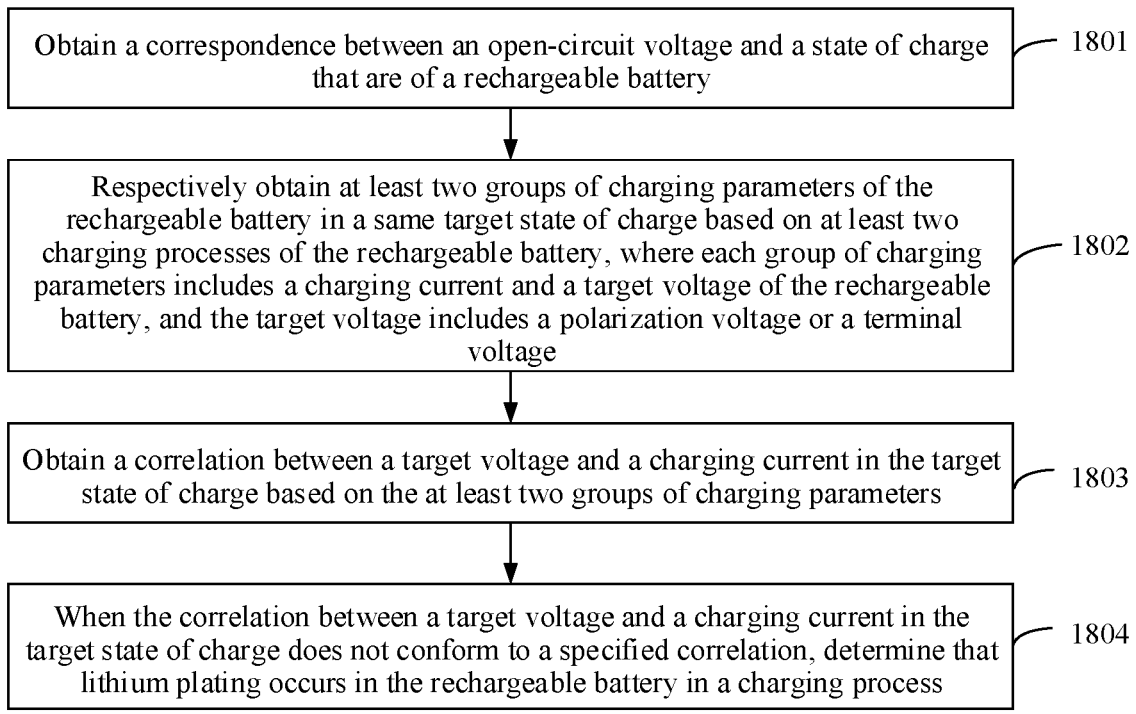
FIG. 18 is a flowchart of another method for detecting lithium plating in a rechargeable battery according to an embodiment of this application.

FIG. 18 is a flowchart of another method for detecting lithium plating in a rechargeable battery according to an embodiment of this application. As shown in FIG. 18, the method includes the following steps.

Step 1801: Obtain a correspondence between an open-circuit voltage and a state of charge that are of a rechargeable battery.

Optionally, an implementation process of step 1801 may include: obtaining a correspondence between an open-circuit voltage of a first reference battery and a remaining capacity of the first reference battery based on a charging and discharging test performed on the first reference battery, and obtaining the correspondence between an open-circuit voltage of the rechargeable battery and a state of charge of the rechargeable battery based on the correspondence between an open-circuit voltage of the first reference battery and a remaining capacity of the first reference battery. For an implementation process thereof, refer to the implementation process of obtaining a correspondence between an open-circuit voltage and a state of charge of a rechargeable battery in step 201.

Step 1802: Respectively obtain at least two groups of charging parameters of the rechargeable battery in a same target state of charge in at least two charging processes of the rechargeable battery, where each group of charging parameters includes a charging current and a target voltage of the rechargeable battery, and the target voltage includes a polarization voltage or a terminal voltage.

The two charging processes may both be history charging processes of the rechargeable battery. That is, the at least two groups of charging parameters are all history charging parameters of the rechargeable battery. In this case, it may be detected, based on the at least two groups of charging parameters, whether lithium plating has occurred in the rechargeable battery in a history charging process. By detecting whether lithium plating has occurred in the rechargeable battery, degradation assessment and safety risk prediction may be performed on the rechargeable battery, to provide a use suggestion for the rechargeable battery in a targeted manner, so as to improve safety of using the rechargeable battery.

Alternatively, one of the two charging processes is a current charging process of the rechargeable battery. That is, the at least two groups of charging parameters may include at least one group of charging parameters obtained when the rechargeable battery is charged to the target state of charge in the current charging process of the rechargeable battery. In this case, whether lithium plating occurs in the rechargeable battery in the current charging process may be detected based on the at least two groups of charging parameters. By detecting whether lithium plating occurs in the rechargeable battery in the current charging process, a charging policy may be improved based on a detection result, to improve safety of charging the rechargeable battery.

In an implementation, when the target voltage is a terminal voltage, an implementation process of step 1802 may include: respectively obtaining terminal voltages of the rechargeable battery in the target state of charge in the at least two charging processes of the rechargeable battery.

Figure 19:
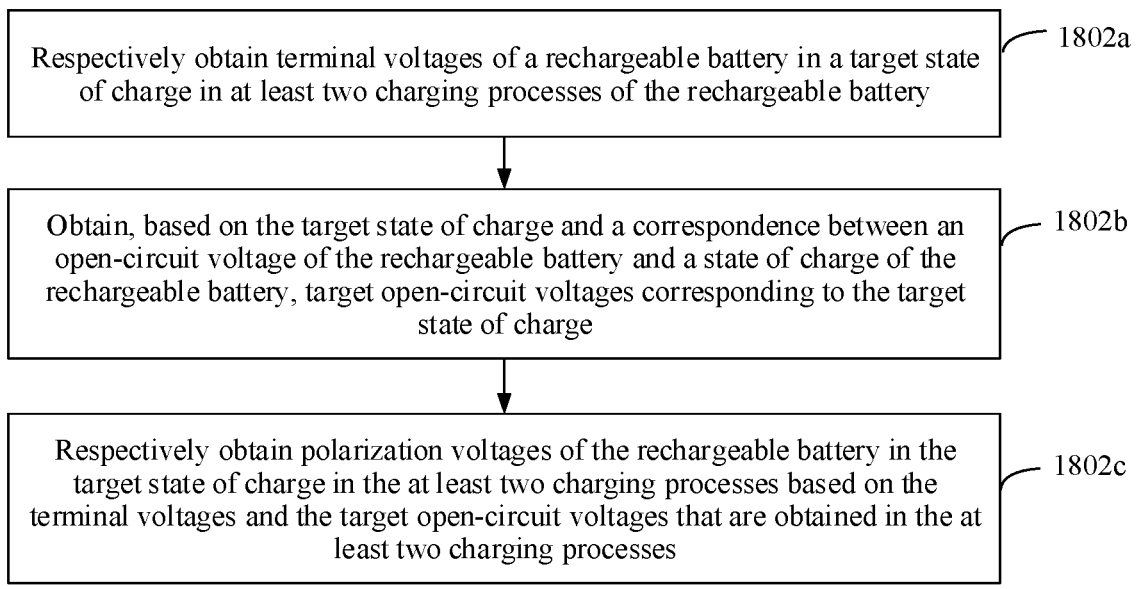
FIG. 19 is a flowchart of a method for obtaining a polarization voltage of a rechargeable battery in a target state of charge according to an embodiment of this application.

In another implementation, when the target voltage is a polarization voltage, as shown in FIG. 19, an implementation process of step 1802 may include the following steps.

Step 1802*a*: Respectively obtain the terminal voltages of the rechargeable battery in the target state of charge in the at least two charging processes of the rechargeable battery.

Step 1802*b*: Obtain, based on the target state of charge and a correspondence between an open-circuit voltage of the rechargeable battery and a state of charge of the rechargeable battery, target open-circuit voltages corresponding to the target state of charge.

The correspondence between an open-circuit voltage of the rechargeable battery and a state of charge of the rechargeable battery reflects a characteristic of the rechargeable battery, and does not change with a current, a voltage, or the like. Therefore, the correspondence between an open-circuit voltage of the rechargeable battery and a state of charge of the rechargeable battery may be queried based on the target state of charge, to obtain the target open-circuit voltage of the rechargeable battery in the target state of charge.

Step 1802*c*: Respectively obtain polarization voltages of the rechargeable battery in the target state of charge in the at least two charging processes based on the terminal voltages and the target open-circuit voltages that are obtained in the at least two charging processes.

There is a reference relationship among an open-circuit voltage, a polarization voltage, and a terminal voltage of the rechargeable battery. For example, the reference relationship among an open-circuit voltage, a polarization voltage, and a terminal voltage of the rechargeable battery may be as follows: The polarization voltage is equal to a difference between the terminal voltage and the open-circuit voltage. Therefore, after the terminal voltage and the target open-circuit voltage are obtained, the polarization voltage of the rechargeable battery may be obtained based on the reference relationship.

Step 1803: Obtain a correlation between a target voltage and a charging current in the target state of charge based on the at least two groups of charging parameters.

Each group of charging parameters includes a charging current and a target voltage of the rechargeable battery. A correlation between a charging current and a target voltage can be obtained based on each group of charging parameters. For example, the charging current and the target voltage satisfy a linear relationship $y=a \times x+b$, or satisfy a mathematical relationship such as a quadratic function relationship $y=a \times x^2+b \times x+c$.

In addition, after the at least two groups of charging parameters are obtained, curve fitting may be first performed based on each group of charging parameters, and then an expression of a fitted curve is obtained. The expression represents the correlation between a target voltage and a charging current in the target state of charge.

Step 1804: When the correlation between a target voltage and a charging current in the target state of charge does not conform to a specified correlation, determine that lithium plating occurs in the rechargeable battery in a charging process.

Optionally, the specified correlation may be obtained based on a target voltage of the rechargeable battery and a charging current less than a reference current threshold of the rechargeable battery that are in the target state of charge in a history charging process. A standard for obtaining the reference current threshold is as follows: In a history charging process, when the rechargeable battery is charged to the target state of charge by using a charging current that is less than the reference current threshold, lithium plating does not occur in the rechargeable battery. Correspondingly, an obtained specified correlation obtained based on the standard is a correlation satisfied by the target voltage and the charging current when lithium plating does not occur in the rechargeable battery. Therefore, when a correlation of the target voltage and the charging current does not conform with the specified correlation, it may be considered that lithium plating occurs in the rechargeable battery in a charging process. In other words, whether lithium plating occurs in the rechargeable battery can be effectively detected.

The specified correlation obtained in this manner is a correlation satisfied by the rechargeable battery in an actual charging state when lithium plating does not occur in the rechargeable battery. When whether lithium plating occurs is detected based on the specified correlation, accuracy of lithium plating detection can be further ensured.

Optionally, the reference current threshold may alternatively be obtained based on experience, big data, or the like. For example, the reference current threshold may be a current at a low rate. For example, the reference current threshold may be a current less than 1/10C.

It should be noted that the specified correlation may be a relationship in which impact of an Arrhenius effect of a temperature on a voltage is considered. The correlation between a target voltage and a charging current in the target state of charge is obtained based on an actual charging process, and an Arrhenius effect of a temperature in the actual charging process affects the target voltage. In other words, the Arrhenius effect of a temperature is also considered in the correlation between a target voltage and a charging current in the target state of charge. Therefore, when the Arrhenius effect of a temperature is considered in the specified correlation, detecting, based on the specified correlation, whether lithium plating occurs in the rechargeable battery in a charging process can effectively ensure detection accuracy.

In conclusion, according to the method for detecting lithium plating in a rechargeable battery provided in this embodiment of this application, the at least two groups of charging parameters of the rechargeable battery in the same target state of charge are respectively obtained in the at least two charging processes of the rechargeable battery, the correlation between a target voltage and a charging current in the target state of charge is obtained based on the at least two groups of charging parameters, and when the correlation does not conform with the specified correlation, it is determined that lithium plating occurs in the rechargeable battery in the charging process. Each group of charging parameters includes a charging current and a target voltage of the rechargeable battery, and the target voltage includes a polarization voltage or a terminal voltage. Because the charging parameters required in the lithium plating detection process are easy to obtain, and no reference electrode needs to be used to obtain the parameters. Therefore, compared with a related technology, the method for detecting lithium plating in a rechargeable battery provided in this embodiment of this application can ensure accuracy of an obtained negative electrode voltage, and further ensure accuracy of lithium plating detection performed on a rechargeable battery.

In addition, parameters such as a state of charge, a terminal voltage, and a polarization proportion that are required for lithium plating detection are easy to obtain, so that the method for detecting lithium plating is easy to implement. In addition, data required for lithium plating detection is data that can be collected by an existing battery management system, and obtaining the data has no additional requirement on sensors for a current, a voltage, and the like. Therefore, the method can be conveniently deployed in the battery management system without increasing hardware costs, so that applicability is high.

Figure 20:
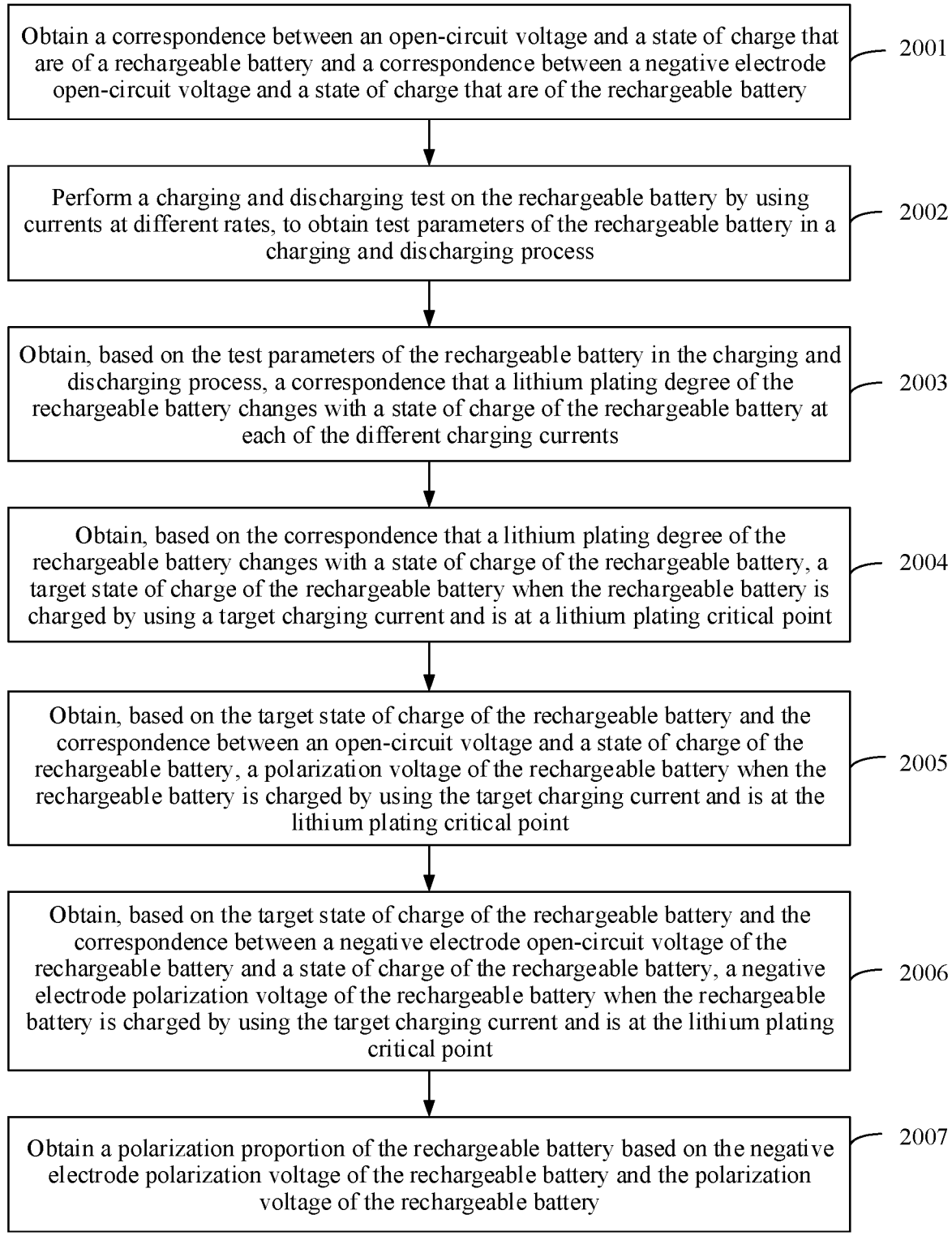
FIG. 20 is a flowchart of a method for obtaining a polarization proportion of a rechargeable battery according to an embodiment of this application.

An embodiment of this application further provides a method for obtaining a polarization proportion of a rechargeable battery. As shown in FIG. 20, the method includes the following steps.

Step 2001: Obtain a correspondence between an open-circuit voltage and a state of charge that are of a rechargeable battery and a correspondence between a negative electrode open-circuit voltage and a state of charge that are of the rechargeable battery.

For an implementation process of step 2001, refer to the implementation process of step 201.

Step 2002: Perform a charging and discharging test on the rechargeable battery by using currents at different rates, to obtain test parameters of the rechargeable battery in a charging and discharging process.

For an implementation process of step 2002, refer to the implementation process of step 202.

Step 2003: Obtain, based on the test parameters of the rechargeable battery in the charging and discharging process, a correspondence that a lithium plating degree of the rechargeable battery changes with a state of charge of the rechargeable battery at each of the different charging currents.

For an implementation process of step 2003, refer to the implementation process of step 203.

Step 2004: Obtain, based on the correspondence that a lithium plating degree of the rechargeable battery changes with a state of charge of the rechargeable battery, a target state of charge of the rechargeable battery when the rechargeable battery is charged by using a target charging current and is at a lithium plating critical point.

For an implementation process of step 2004, refer to the implementation process of step 2041.

Step 2005: Obtain, based on the target state of charge of the rechargeable battery and the correspondence between an open-circuit voltage of the rechargeable battery and a state of charge of the rechargeable battery, a polarization voltage of the rechargeable battery when the rechargeable battery is charged by using the target charging current and is at the lithium plating critical point.

Figure 21:
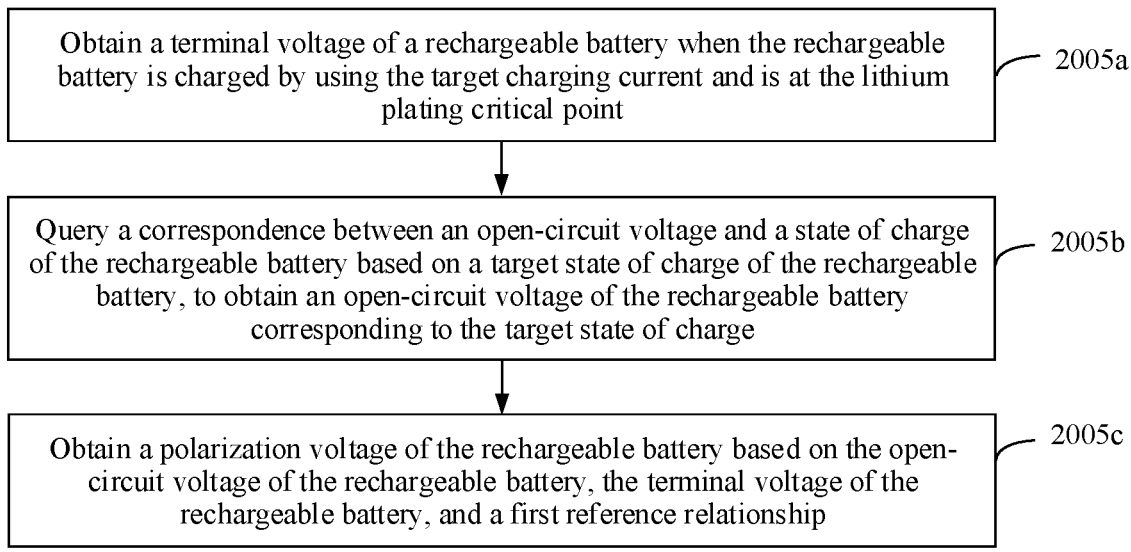
FIG. 21 is a flowchart of a method for obtaining a polarization voltage of a rechargeable battery when the rechargeable battery is charged by using a target charging current and is at a lithium plating critical point according to an embodiment of this application.

For an implementation process of step 2005, refer to the implementation process of step 2042. For example, as shown in FIG. 21, an implementation process of step 2005 includes the following steps.

Step 2005a: Obtain a terminal voltage of the rechargeable battery when the rechargeable battery is charged by using the target charging current and is at the lithium plating critical point.

For an implementation process of step 2005a, refer to the implementation process of step 2042a.

Step 2005b: Query the correspondence between an open-circuit voltage of the rechargeable battery and a state of charge of the rechargeable battery based on the target state of charge of the rechargeable battery, to obtain an open-circuit voltage that is of the rechargeable battery and that corresponds to the target state of charge.

For an implementation process of step 2005b, refer to the implementation process of step 2042b.

Step 2005c: Obtain a polarization voltage of the rechargeable battery based on the open-circuit voltage of the rechargeable battery, the terminal voltage of the rechargeable battery, and a first reference relationship.

The first reference relationship is a relationship among an open-circuit voltage, a terminal voltage, and a polarization voltage that are of the rechargeable battery. In addition, for an implementation process of step 2005c, refer to the implementation process of step 2042c.

Step 2006: Obtain, based on the target state of charge of the rechargeable battery and the correspondence between a negative electrode open-circuit voltage of the rechargeable battery and a state of charge of the rechargeable battery, a negative electrode polarization voltage of the rechargeable battery when the rechargeable battery is charged by using the target charging current and is at the lithium plating critical point.

Figure 22:
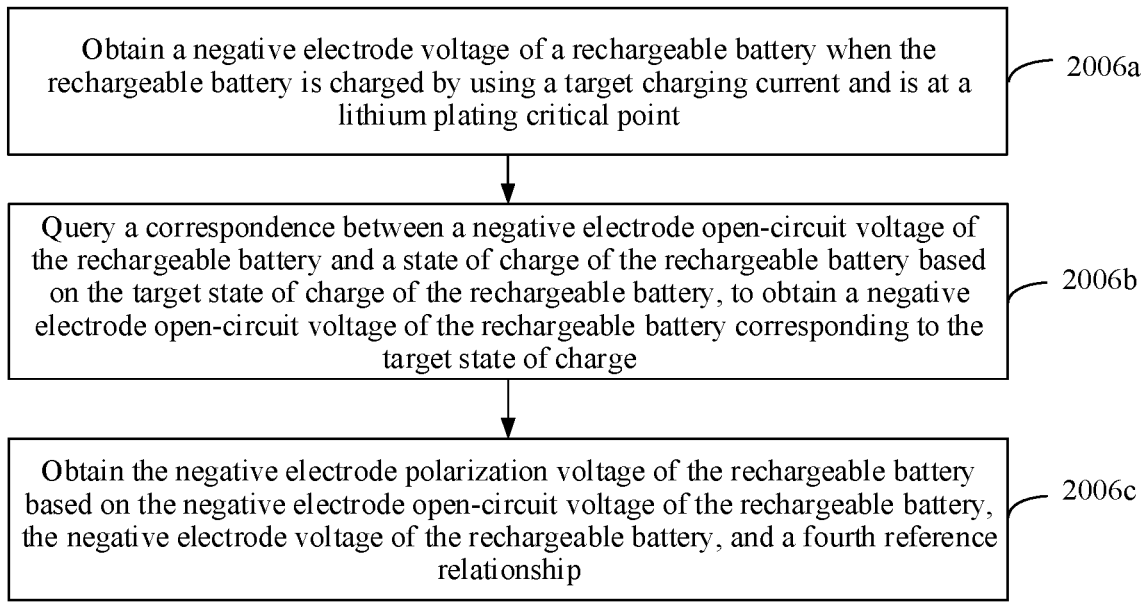
FIG. 22 is a flowchart of a method for obtaining a negative electrode polarization voltage of a rechargeable battery when the rechargeable battery is charged by using a target charging current and is at a lithium plating critical point according to an embodiment of this application.

For an implementation process of step 2006, refer to the implementation process of step 2043. For example, as shown in FIG. 22, an implementation process of step 2006 includes the following steps.

Step 2006a: Obtain a negative electrode voltage of the rechargeable battery when the rechargeable battery is charged by using the target charging current and is at the lithium plating critical point.

For an implementation process of step 2006a, refer to the implementation process of step 2043a.

Step 2006b: Query the correspondence between a negative electrode open-circuit voltage and a state of charge of the rechargeable battery based on the target state of charge of the rechargeable battery, to obtain a negative electrode open-circuit voltage that is of the rechargeable battery and that corresponds to the target state of charge.

For an implementation process of step 2006a, refer to the implementation process of step 2043a.

Step 2006c: Obtain the negative electrode polarization voltage of the rechargeable battery based on the negative electrode open-circuit voltage of the rechargeable battery, the negative electrode voltage of the rechargeable battery, and a fourth reference relationship.

The fourth reference relationship is a relationship among a negative electrode open-circuit voltage, a negative electrode polarization voltage, and a negative electrode voltage that are of the rechargeable battery. In addition, for an implementation process of step 2006a, refer to the implementation process of step 2043a.

Step 2007: Obtain a polarization proportion of the rechargeable battery based on the negative electrode polarization voltage of the rechargeable battery and the polarization voltage of the rechargeable battery.

The polarization proportion of the rechargeable battery represents a proportion that is of a negative electrode polarization voltage of the rechargeable battery to a polarization voltage of the rechargeable battery and that is obtained when the rechargeable battery is at a lithium plating critical point. Therefore, it may be obtained that the polarization proportion of the rechargeable battery is equal to a ratio of the negative electrode polarization voltage of the rechargeable battery to the polarization voltage of the rechargeable battery.

It should be noted that, to ensure accuracy of the polarization proportion of the rechargeable battery, a plurality of polarization proportions may be obtained by using a plurality of charging currents based on the foregoing step 2004 to step 2007, and the polarization proportion of the rechargeable battery is obtained based on the plurality of polarization proportions. For example, an average value of the plurality of polarization proportions may be used as the polarization proportion of the rechargeable battery, or a weighted sum of the plurality of polarization proportions may be used as the polarization proportion of the rechargeable battery. This is not specifically limited in this embodiment of this application.

It should be further noted that in this embodiment of this application, an example in which the open-circuit voltage, the polarization voltage, the negative electrode open-circuit voltage, and the negative electrode polarization voltage of the rechargeable battery are obtained by querying the correspondence is used to describe the method provided in this embodiment of this application, but the example is not used to limit an implementation of obtaining the open-circuit voltage, the polarization voltage, the negative electrode open-circuit voltage, and the negative electrode polarization voltage of the rechargeable battery. For example, the open-circuit voltage, the polarization voltage, the negative electrode open-circuit voltage, and the negative electrode polarization voltage of the rechargeable battery may alternatively be obtained by measuring a voltage.

In conclusion, according to the method for obtaining a polarization proportion of a rechargeable battery provided in this embodiment of this application, the polarization voltage and the negative electrode polarization voltage of the rechargeable battery when the rechargeable battery is charged by using the target charging current and is at the lithium plating critical point are obtained, and the polarization proportion of the rechargeable battery can be obtained based on the negative electrode polarization voltage and the polarization voltage of the rechargeable battery. This provides an easy implementation of obtaining a polarization proportion of a rechargeable battery.

The polarization proportion of the rechargeable battery is obtained, so that the rechargeable battery can be analyzed based on the polarization proportion. For example, when degradation occurs in the rechargeable battery, contribution rates of internal resistance of a positive electrode of the rechargeable battery and internal resistance of a negative electrode of the rechargeable battery to degradation may be analyzed based on the polarization proportion. Alternatively, a maximum charging current that can be used by the rechargeable battery on the premise of safe charging may be estimated based on the polarization proportion. Alternatively, a maximum charging current that can be used by the rechargeable battery in a specific state of charge on the premise of safe charging may be estimated based on the polarization proportion.

It should be noted that a sequence of steps of the method for detecting lithium plating in a rechargeable battery provided in embodiments of this application may be properly adjusted, or the step may be correspondingly added or deleted based on a situation. For example, a sequence of step 201 and step 202 may be adjusted as required. Any variation method readily figured out by a person skilled in the art within the technical scope disclosed in this application shall fall within the protection scope of this application. Therefore, details are not described herein.

Figure 23:
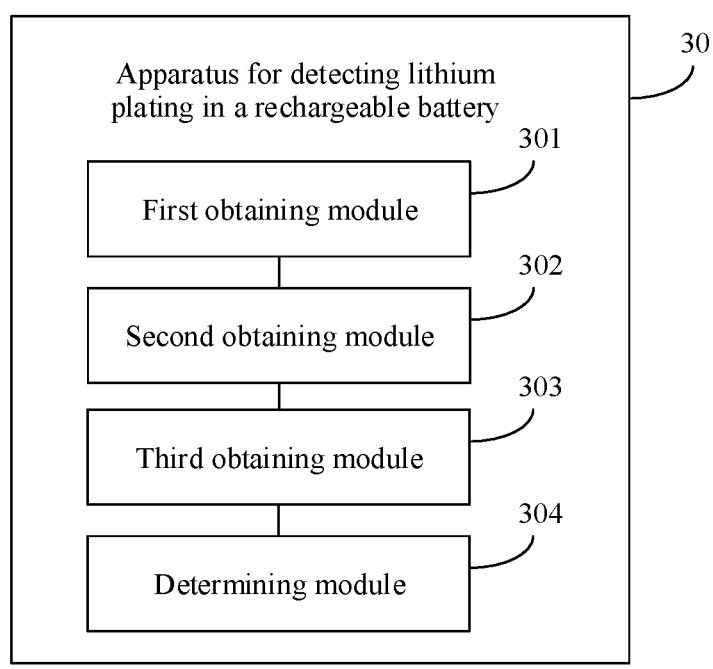
FIG. 23 is a schematic diagram of a structure of an apparatus for detecting lithium plating in a rechargeable battery according to an embodiment of this application.

An embodiment of this application further provides an apparatus for detecting lithium plating in a rechargeable battery. As shown in FIG. 23, the apparatus 30 for detecting lithium plating in a rechargeable battery includes:

a first obtaining module 301, configured to obtain an open-circuit voltage of a rechargeable battery and a negative electrode open-circuit voltage of the rechargeable battery based on a state of charge of the rechargeable battery;

a second obtaining module 302, configured to obtain a negative electrode polarization voltage of the rechargeable battery based on the open-circuit voltage of the rechargeable battery, a terminal voltage of the rechargeable battery, and a polarization proportion of the rechargeable battery, where the polarization proportion of the rechargeable battery represents a proportion that is of a negative electrode polarization voltage of the rechargeable battery to a polarization voltage of the rechargeable battery and that is obtained when the rechargeable battery is at a lithium plating critical point;

a third obtaining module 303, configured to obtain a negative electrode voltage of the rechargeable battery based on the negative electrode open-circuit voltage of the rechargeable battery and the negative electrode polarization voltage of the rechargeable battery; and a determining module 304, configured to determine, based on the negative electrode voltage of the rechargeable battery, whether lithium plating occurs in the rechargeable battery.

Optionally, the determining module 304 is specifically configured to: when the negative electrode voltage of the rechargeable battery is less than a reference voltage threshold, determine that lithium plating occurs in the rechargeable battery.

Optionally, the second obtaining module 302 is specifically configured to: obtain a polarization voltage of the rechargeable battery based on the open-circuit voltage of the rechargeable battery, the terminal voltage of the rechargeable battery, and a first reference relationship, where the first reference relationship is a relationship among an open-circuit voltage of the rechargeable battery, a terminal voltage of the rechargeable battery, and a polarization voltage of the rechargeable battery; and obtain the negative electrode polarization voltage of the rechargeable battery based on the polarization voltage of the rechargeable battery and the polarization proportion of the rechargeable battery.

Figure 24:
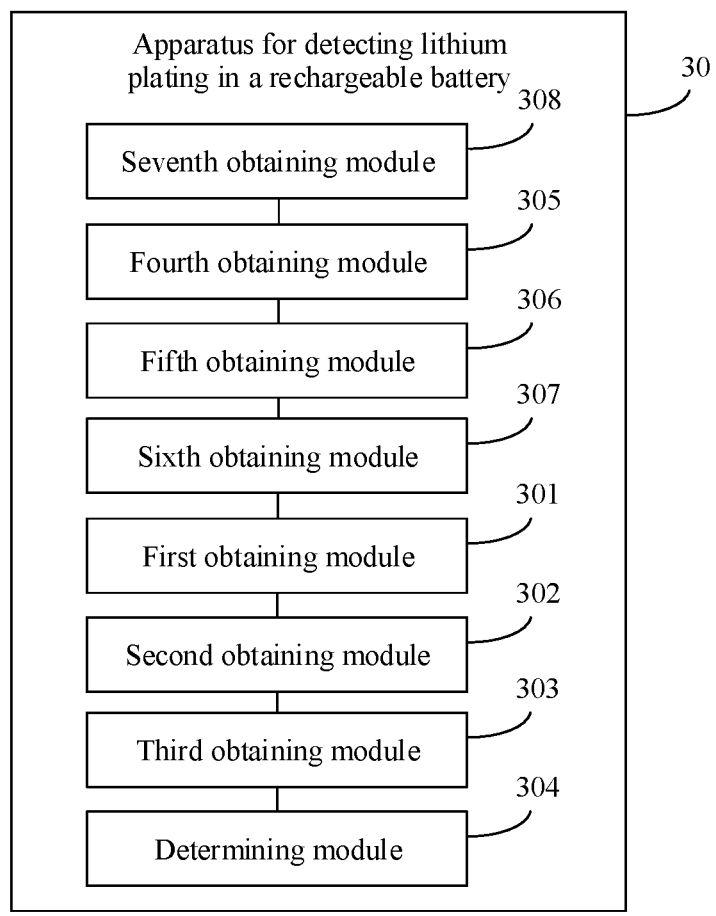
FIG. 24 is a schematic diagram of a structure of another apparatus for detecting lithium plating in a rechargeable battery according to an embodiment of this application.

Optionally, as shown in FIG. 24, the apparatus 30 for detecting lithium plating in a rechargeable battery further includes:

a fourth obtaining module 305, configured to obtain a polarization voltage of a first reference battery when the first reference battery is charged by using a target charging current and is at a lithium plating critical point;

a fifth obtaining module 306, configured to obtain a negative electrode polarization voltage of the first reference battery when the first reference battery is charged by using the target charging current and is at the lithium plating critical point; and a sixth obtaining module 307, configured to obtain the polarization proportion of the rechargeable battery based on the negative electrode polarization voltage of the first reference battery and the polarization voltage of the first reference battery.

Optionally, the fourth obtaining module 305 is specifically configured to: obtain a state of charge of the first reference battery and a terminal voltage of the first reference battery when the first reference battery is charged by using the target charging current and is at the lithium plating critical point; query a correspondence between an open-circuit voltage of the first reference battery and a state of charge of the first reference battery based on the state of charge of the first reference battery, to obtain an open-circuit voltage of the first reference battery; and obtain the polarization voltage of the first reference battery based on the open-circuit voltage of the first reference battery, the terminal voltage of the first reference battery, and a second reference relationship, where the second reference relationship is a relationship among an open-circuit voltage of the first reference battery, a terminal voltage of the first reference battery, and a polarization voltage of the first reference battery.

Optionally, the fifth obtaining module 306 is specifically configured to: obtain a state of charge of the first reference battery and a negative electrode voltage of the first reference battery when the first reference battery is charged by using the target charging current and is at the lithium plating critical point; query a correspondence between a negative electrode open-circuit voltage of the first reference battery and a state of charge of the first reference battery based on the state of charge of the first reference battery, to obtain a negative electrode open-circuit voltage of the first reference battery; and obtain the negative electrode polarization voltage of the first reference battery based on the negative electrode open-circuit voltage of the first reference battery, the negative electrode voltage of the first reference battery, and a third reference relationship, where the third reference relationship is a relationship among a negative electrode voltage of the first reference battery, a negative electrode open-circuit voltage of the first reference battery, and a negative electrode polarization voltage of the first reference battery.

Optionally, the first obtaining module 301 is specifically configured to: query a correspondence between an open-circuit voltage of the rechargeable battery and a state of charge of the rechargeable battery based on the state of charge of the rechargeable battery, to obtain the open-circuit voltage of the rechargeable battery; and query a correspondence between a negative electrode open-circuit voltage of the rechargeable battery and a state of charge of the rechargeable battery based on the state of charge of the rechargeable battery, to obtain the negative electrode open-circuit voltage of the rechargeable battery.

Optionally, as shown in FIG. 24, the apparatus 30 for detecting lithium plating in a rechargeable battery further includes:

a seventh obtaining module 308, configured to: obtain a correspondence between an open-circuit voltage of the first reference battery and a remaining capacity of the first reference battery based on a charging and discharging test performed on the first reference battery, and obtain the correspondence between an open-circuit voltage of the rechargeable battery and a state of charge of the rechargeable battery based on the correspondence between an open-circuit voltage of the first reference battery and a remaining capacity of the first reference battery; and/or a seventh obtaining module 308, configured to: obtain a correspondence between an open-circuit voltage of a second reference battery and a remaining capacity of the second reference battery based on a charging and discharging test performed on the second reference battery, and obtain the correspondence between a negative electrode open-circuit voltage of the rechargeable battery and a state of charge of the rechargeable battery based on the correspondence between an open-circuit voltage of the second reference battery and a remaining capacity of the second reference battery, where a positive electrode material of the second reference battery may be the same as a negative electrode material of the first reference battery, and a negative electrode voltage of the second reference battery is constant.

In conclusion, according to the apparatus for detecting lithium plating in a rechargeable battery provided in this embodiment of this application, the first obtaining module obtains the open-circuit voltage of the rechargeable battery and the negative electrode open-circuit voltage of the rechargeable battery based on the state of charge of the rechargeable battery, the second obtaining module obtains the negative electrode polarization voltage of the rechargeable battery based on the open-circuit voltage of the rechargeable battery, the terminal voltage of the rechargeable battery, and the polarization proportion of the rechargeable battery, the third obtaining module obtains the negative electrode voltage of the rechargeable battery based on the negative electrode open-circuit voltage of the rechargeable battery and the negative electrode polarization voltage of the rechargeable battery, and the determining module determines whether lithium plating occurs in the rechargeable battery based on the negative electrode voltage of the rechargeable battery. Known parameters required for obtaining the negative electrode voltage of the rechargeable battery are a state of charge, a terminal voltage, and a polarization proportion of the rechargeable battery, and the state of charge, the terminal voltage, and the polarization proportion are easy to obtain without using a reference electrode to obtain the parameters. Therefore, compared with a related technology, the method for detecting lithium plating in a rechargeable battery provided in embodiments of this application can ensure accuracy of the obtained negative electrode voltage, and further ensure accuracy of lithium plating detection for the rechargeable battery.

In addition, parameters such as a state of charge, a terminal voltage, and a polarization proportion that are required for lithium plating detection are easy to obtain, so that the method for detecting lithium plating is easy to implement. In addition, data required for lithium plating detection is data that can be collected by an existing battery management system, and obtaining the data has no additional requirement on sensors for a current, a voltage, and the like. Therefore, the method can be conveniently deployed in the battery management system without increasing hardware costs, so that applicability is high.

Figure 25:
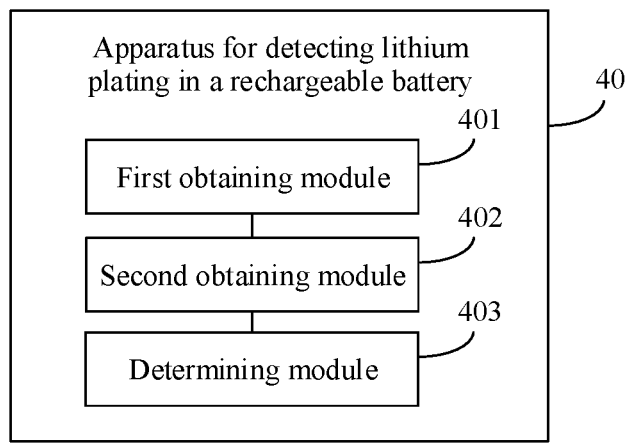
FIG. 25 is a schematic diagram of a structure of still another apparatus for detecting lithium plating in a rechargeable battery according to an embodiment of this application.

An embodiment of this application further provides another apparatus for detecting lithium plating in a rechargeable battery. As shown in FIG. 25, the apparatus 40 for detecting lithium plating in a rechargeable battery includes:

a first obtaining module 401, configured to respectively obtain at least two groups of charging parameters of a rechargeable battery in a same target state of charge in at least two charging processes of the rechargeable battery, where each group of charging parameters includes a charging current and a target voltage that are of the rechargeable battery, and the target voltage includes a polarization voltage or a terminal voltage;

a second obtaining module 402, configured to obtain, a correlation between a target voltage and a charging current in the target state of charge based on the at least two groups of charging parameters; and a determining module 403, configured to: when the correlation does not conform with a specified correlation, determine that lithium plating occurs in the rechargeable battery in a charging process.

Optionally, when the target voltage is a polarization voltage, the first obtaining module 401 is specifically configured to: respectively obtain terminal voltages of the rechargeable battery in the target state of charge in the at least two charging processes of the rechargeable battery; obtain, based on the target state of charge and a correspondence between an open-circuit voltage of the rechargeable battery and a state of charge of the rechargeable battery, target open-circuit voltages corresponding to the target state of charge; and respectively obtain polarization voltages of the rechargeable battery in the target state of charge in the at least two charging processes based on the terminal voltages and the target open-circuit voltages that are obtained in the at least two charging processes.

Figure 26:
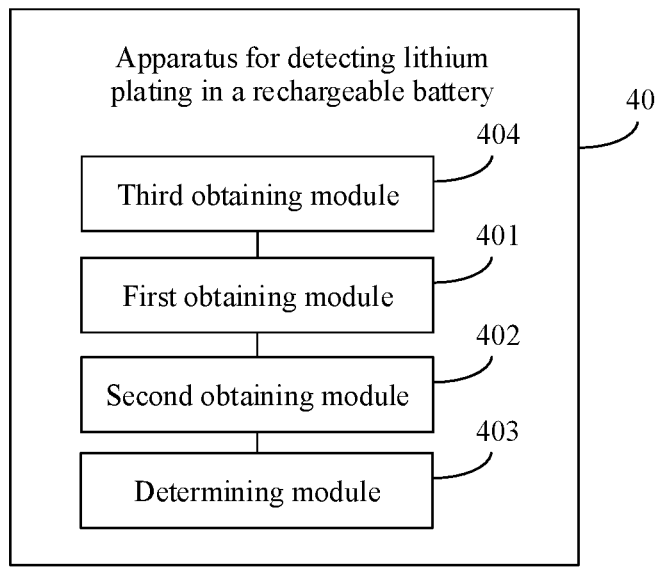
FIG. 26 is a schematic diagram of a structure of yet still another apparatus for detecting lithium plating in a rechargeable battery according to an embodiment of this application.

Optionally, as shown in FIG. 26, the apparatus 40 for detecting lithium plating in a rechargeable battery further includes:

a third obtaining module 404, configured to: obtain a correspondence between an open-circuit voltage of the first reference battery and a remaining capacity of the first reference battery based on a charging and discharging test performed on the first reference battery, and obtain the correspondence between an open-circuit voltage of the rechargeable battery and a state of charge of the rechargeable battery based on the correspondence between an open-circuit voltage of the first reference battery and a remaining capacity of the first reference battery.

Optionally, the specified correlation is obtained based on a target voltage of the rechargeable battery and a charging current less than a reference current threshold of the rechargeable battery that are in the target state of charge in a history charging process.

Optionally, the at least two groups of charging parameters include at least one group of charging parameters obtained when the rechargeable battery is charged to the target state of charge in a current charging process of the rechargeable battery.

In conclusion, according to the apparatus for detecting lithium plating in a rechargeable battery provided in this embodiment of this application, the first obtaining module respectively obtains the at least two groups of charging parameters of the rechargeable battery in the same target state of charge in the at least two charging processes of the rechargeable battery, the second obtaining module obtains the correlation between a target voltage and a charging current in the target state of charge based on the at least two groups of charging parameters, and when the correlation does not conform with the specified correlation, the determining module determines that lithium plating occurs in the rechargeable battery in the charging process. Each group of charging parameters includes a charging current and a target voltage of the rechargeable battery, and the target voltage includes a polarization voltage or a terminal voltage. Because the charging parameters required in the lithium plating detection process are easy to obtain, and no reference electrode needs to be used to obtain the parameters. Therefore, compared with a related technology, the method for detecting lithium plating in a rechargeable battery provided in embodiments of this application can ensure accuracy of an obtained negative electrode voltage, and further ensure accuracy of lithium plating detection performed on a rechargeable battery.

In addition, parameters such as a state of charge, a terminal voltage, and a polarization proportion that are required for lithium plating detection are easy to obtain, so that the method for detecting lithium plating is easy to implement. In addition, data required for lithium plating detection is data that can be collected by an existing battery management system, and obtaining the data has no additional requirement on sensors for a current, a voltage, and the like. Therefore, the method can be conveniently deployed in the battery management system without increasing hardware costs, so that applicability is high.

Figure 27:
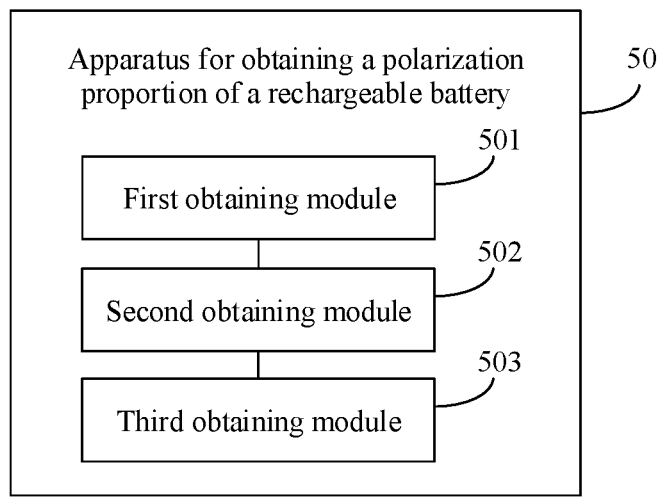
FIG. 27 is a schematic diagram of a structure of an apparatus for obtaining a polarization proportion of a rechargeable battery according to an embodiment of this application.

An embodiment of this application further provides an apparatus for obtaining a polarization proportion of a rechargeable battery. As shown in FIG. 27, the apparatus 50 for obtaining a polarization proportion of a rechargeable battery includes:

a first obtaining module 501, configured to obtain a polarization voltage of a rechargeable battery when the rechargeable battery is charged by using a target charging current and is at a lithium plating critical point;

a second obtaining module 502, configured to obtain a negative electrode polarization voltage of the rechargeable battery when the rechargeable battery is charged by using the target charging current and is at the lithium plating critical point; and a third obtaining module 503, configured to obtain a polarization proportion of the rechargeable battery based on the negative electrode polarization voltage of the rechargeable battery and the polarization voltage of the rechargeable battery.

Optionally, the first obtaining module 501 is specifically configured to: obtain a state of charge of the rechargeable battery and a terminal voltage of the rechargeable battery when the rechargeable battery is charged by using the target charging current and is at the lithium plating critical point; obtain an open-circuit voltage of the rechargeable battery based on the state of charge of the rechargeable battery; and obtain the polarization voltage of the rechargeable battery based on the open-circuit voltage of the rechargeable battery and the terminal voltage of the rechargeable battery.

Optionally, the first obtaining module 501 is specifically configured to: obtain a correspondence between an open-circuit voltage of the rechargeable battery and a state of charge of the rechargeable battery; and query the correspondence between an open-circuit voltage of the rechargeable battery and a state of charge of the rechargeable battery based on the state of charge of the rechargeable battery, to obtain the open-circuit voltage of the rechargeable battery corresponding to the state of charge of the rechargeable battery.

Optionally, the second obtaining module 502 is specifically configured to: obtain a state of charge of the rechargeable battery and a negative electrode voltage of the rechargeable battery when the rechargeable battery is charged by using the target charging current and is at the lithium plating critical point; obtain a negative electrode open-circuit voltage of the rechargeable battery based on the state of charge of the rechargeable battery; and obtain the negative electrode polarization voltage of the rechargeable battery based on the negative electrode open-circuit voltage of the rechargeable battery and the negative electrode voltage of the rechargeable battery.

Optionally, the second obtaining module 502 is specifically configured to: obtain a correspondence between a negative electrode open-circuit voltage of the rechargeable battery and a state of charge of the rechargeable battery; and query the correspondence between a negative electrode open-circuit voltage of the rechargeable battery and a state of charge of the rechargeable battery based on the state of charge of the rechargeable battery, to obtain the negative electrode open-circuit voltage of the rechargeable battery corresponding to the state of charge of the rechargeable battery.

In conclusion, according to the apparatus for obtaining a polarization proportion of a rechargeable battery provided in this embodiment of this application, the polarization voltage and the negative electrode polarization voltage of the rechargeable battery obtained when the rechargeable battery is charged by using the target charging current and is at the lithium plating critical point are obtained, and the polarization proportion of the rechargeable battery can be obtained based on the negative electrode polarization voltage and the polarization voltage of the rechargeable battery. This provides an easy implementation of obtaining a polarization proportion of a rechargeable battery.

It may be clearly understood by a person skilled in the art that, for the purpose of convenient and brief description, for a detailed working process of the foregoing apparatuses and modules, refer to a corresponding process in the foregoing method embodiment, and details are not described herein again.

Figure 28:
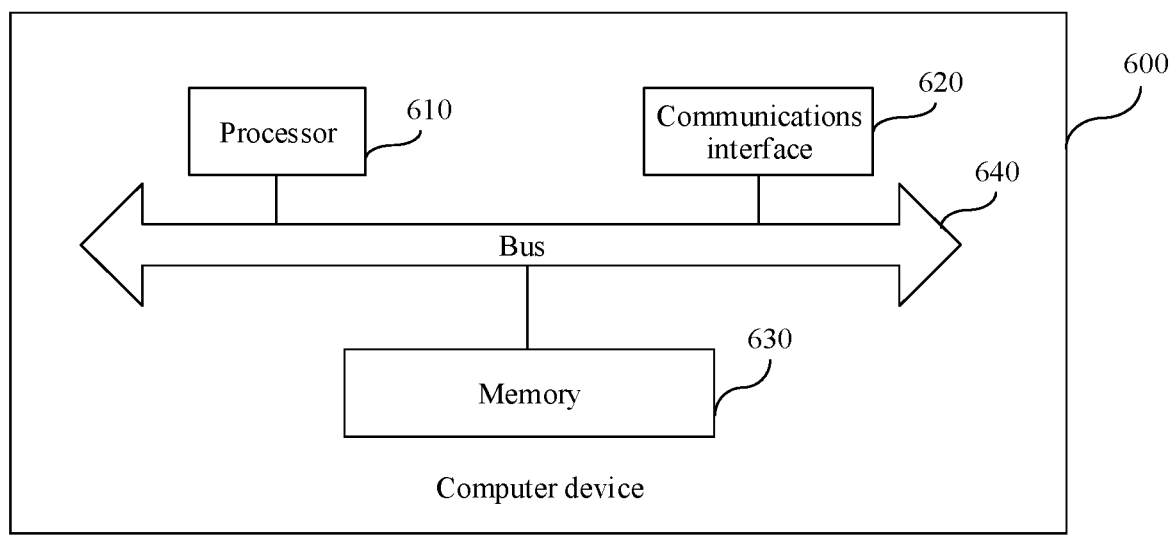
FIG. 28 is a schematic diagram of a structure of a computer device according to an embodiment of this application.

An embodiment of this application further provides a computer device. As shown in FIG. 28, the computer device 600 includes a processor 610, a communications interface 620, a memory 630, and a bus 640. The processor 610, the communications interface 620, and the memory 630 are connected to each other by using the bus 640.

The bus 640 may be classified into an address bus, a data bus, a control bus, and the like. For ease of expression, the bus is indicated by only a bold line in FIG. 28, which does not mean that only one bus or one type of bus exists.

The memory 630 may be a volatile memory or a non-volatile memory, or may include both a volatile memory and a non-volatile memory. The non-volatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), a flash memory (flash memory), a hard disk drive (hard disk drive, HDD), or a solid-state drive (solid-state drive, SSD). The volatile memory may be a random access memory (random access memory, RAM), used as an external cache. Through example but not limitative description, many forms of RAMs may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

The processor 610 may be a hardware chip, and is configured to complete the method for detecting lithium plating in a rechargeable battery provided in embodiments of this application. The hardware chip may be an application-specific integrated circuit (application-specific integrated circuit, ASIC), a programmable logic device (programmable logic device, PLD), or a combination thereof. The PLD may be a complex programmable logic device (complex programmable logic device, CPLD), a field-programmable gate array (field-programmable gate array, FPGA), a generic array logic (generic array logic, GAL), or any combination thereof. Alternatively, the processor 610 may be a general purpose processor, such as a central processing unit (central processing unit, CPU), a network processor (network processor, NP), or a combination of a CPU and an NP.

Correspondingly, the memory 630 is configured to store program instructions. The processor 610 invokes the program instructions stored in the memory 630, to perform one or more steps or optional implementations of the method for detecting lithium plating in a rechargeable battery provided in embodiments of this application, so that the computer device 600 implements the method for detecting lithium plating in a rechargeable battery provided in the foregoing method embodiments. For example, the processor 610 invokes the program instructions stored in the memory 630, so that the computer device 600 may perform the following steps: obtaining an open-circuit voltage of a rechargeable battery and a negative electrode open-circuit voltage of the rechargeable battery based on a state of charge of the rechargeable battery; obtaining a negative electrode polarization voltage of the rechargeable battery based on the open-circuit voltage of the rechargeable battery, a terminal voltage of the rechargeable battery, and a polarization proportion of the rechargeable battery, where the polarization proportion of the rechargeable battery represents a proportion that is of a negative electrode polarization voltage of the rechargeable battery to a polarization voltage of the rechargeable battery and that is obtained when the rechargeable battery is at a lithium plating critical point; obtaining a negative electrode voltage of the rechargeable battery based on the negative electrode open-circuit voltage of the rechargeable battery and the negative electrode polarization voltage of the rechargeable battery; and determining, based on the negative electrode voltage of the rechargeable battery, whether lithium plating occurs in the rechargeable battery. In addition, the computer device 600 executes computer instructions in the memory 630. For an implementation process of performing this step, refer to corresponding descriptions in the foregoing method embodiments.

The communications interface 620 may implement a communication connection to another component. The communications interface 620 may be any one or any combination of the following components with a network access function: a network interface (such as an Ethernet interface) and a wireless network interface card.

This application further provides a computer-readable storage medium. The computer-readable storage medium may be a non-transitory readable storage medium. When instructions in the computer-readable storage medium are executed by a computer, the computer is configured to perform the method for detecting lithium plating in a rechargeable battery provided in this application. The computer-readable storage medium includes but is not limited to a volatile memory such as a random access memory, and a non-volatile memory such as a flash memory, a hard disk drive (hard disk drive, HDD), or a solid state drive (solid state drive, SSD).

This application further provides a computer program product. The computer program product includes computer instructions. When the computer instructions are executed by a computer device, the computer device performs the method for detecting lithium plating in a rechargeable battery provided in this application.

An embodiment of this application further provides a chip. The chip includes a programmable logic circuit and/or program instructions, and when running, the chip is configured to implement the method for detecting lithium plating in a rechargeable battery provided in the foregoing aspects.

It should be understood that "and/or" mentioned in embodiments of this application indicates that there may be three relationships. For example, A and/or B may indicate that only A exists, both A and B exist, and only B exists. The character "/" usually indicates an "or" relationship between associated objects.

In the embodiments of this application, the terms "first", "second", and "third" are merely used for description, but cannot be understood as an indication or implication of relative importance. The term "at least one" means one or more, and the term "a plurality of" means two or more, unless otherwise expressly limited.

A person of ordinary skill in the art may understand that all or some of the steps of the embodiments may be implemented by hardware or a program instructing related hardware. The program may be stored in a computer-readable storage medium. The storage medium may be a read-only memory, a magnetic disk, an optical disc, or the like.

The foregoing descriptions are merely example embodiments of this application, but are not intended to limit this application. Any modification, equivalent replacement, or improvement made without departing from the spirit and principle of this application should fall within the protection scope of this application.

What is claimed is:

1. A method, comprising:
   obtaining an open-circuit voltage of a rechargeable battery and a negative electrode open-circuit voltage of the rechargeable battery based on a state of charge of the rechargeable battery;
   obtaining a negative electrode polarization voltage of the rechargeable battery based on the open-circuit voltage of the rechargeable battery, a terminal voltage of the rechargeable battery, and a polarization proportion of the rechargeable battery, wherein the polarization proportion of the rechargeable battery represents a proportion that is of the negative electrode polarization voltage of the rechargeable battery to a polarization voltage of the rechargeable battery and that is obtained when the rechargeable battery is at a lithium plating critical point;
   obtaining a negative electrode voltage of the rechargeable battery based on the negative electrode open-circuit voltage of the rechargeable battery and the negative electrode polarization voltage of the rechargeable battery; and
   determining, based on the negative electrode voltage of the rechargeable battery, whether lithium plating occurs in the rechargeable battery.

2. The method according to claim 1, wherein the determining, based on the negative electrode voltage of the rechargeable battery, whether lithium plating occurs in the rechargeable battery comprises:
   when the negative electrode voltage of the rechargeable battery is less than a reference voltage threshold, determining that lithium plating occurs in the rechargeable battery.

3. The method according to claim 1, wherein the obtaining a negative electrode polarization voltage of the rechargeable battery based on the open-circuit voltage of the rechargeable battery, a terminal voltage of the rechargeable battery, and a polarization proportion of the rechargeable battery comprises:
   obtaining the polarization voltage of the rechargeable battery based on the open-circuit voltage of the rechargeable battery, the terminal voltage of the rechargeable battery, and a first reference relationship, wherein the first reference relationship is a relationship among the open-circuit voltage of the rechargeable battery, the terminal voltage of the rechargeable battery, and the polarization voltage of the rechargeable battery; and
   obtaining the negative electrode polarization voltage of the rechargeable battery based on the polarization voltage of the rechargeable battery and the polarization proportion of the rechargeable battery.

4. The method according to claim 1, wherein before the obtaining a negative electrode polarization voltage of the rechargeable battery based on the open-circuit voltage of the rechargeable battery, a terminal voltage of the rechargeable battery, and a polarization proportion of the rechargeable battery, the method further comprises:
   obtaining a polarization voltage of a first reference battery when the first reference battery is charged by using a target charging current and is at the lithium plating critical point;
   obtaining a negative electrode polarization voltage of the first reference battery when the first reference battery is charged by using the target charging current and is at the lithium plating critical point; and
   obtaining the polarization proportion of the rechargeable battery based on the negative electrode polarization voltage of the first reference battery and the polarization voltage of the first reference battery.

5. The method according to claim 4, wherein the obtaining a polarization voltage of a first reference battery when the first reference battery is charged by using a target charging current and is at a lithium plating critical point comprises:
   obtaining a state of charge of the first reference battery and a terminal voltage of the first reference battery when the first reference battery is charged by using the target charging current and is at the lithium plating critical point;
   querying a correspondence between an open-circuit voltage of the first reference battery and the state of charge of the first reference battery based on the state of charge of the first reference battery to obtain the open-circuit voltage of the first reference battery; and
   obtaining the polarization voltage of the first reference battery based on the open-circuit voltage of the first reference battery, the terminal voltage of the first reference battery, and a second reference relationship, wherein the second reference relationship is a relationship among the open-circuit voltage of the first reference battery, the terminal voltage of the first reference battery, and the of the first reference battery.

6. The method according to claim 4, wherein the obtaining a negative electrode polarization voltage of the first reference battery when the first reference battery is charged by using the target charging current and is at the lithium plating critical point comprises:
  obtaining the state of charge of the first reference battery and a negative electrode voltage of the first reference battery when the first reference battery is charged by using the target charging current and is at the lithium plating critical point;
  querying a correspondence between a negative electrode open-circuit voltage of the first reference battery and the state of charge of the first reference battery based on the state of charge of the first reference battery to obtain the negative electrode open-circuit voltage of the first reference battery; and
  obtaining the negative electrode polarization voltage of the first reference battery based on the negative electrode open-circuit voltage of the first reference battery, the negative electrode voltage of the first reference battery, and a third reference relationship, wherein the third reference relationship is a relationship among the negative electrode voltage of the first reference battery, the negative electrode open-circuit voltage of the first reference battery, and the negative electrode polarization voltage of the first reference battery.

7. The method according to claim 1, wherein the obtaining an open-circuit voltage of the rechargeable battery and a negative electrode open-circuit voltage of the rechargeable battery based on a state of charge of the rechargeable battery comprises:
  querying a correspondence between the open-circuit voltage of the rechargeable battery and the state of charge of the rechargeable battery based on the state of charge of the rechargeable battery to obtain the open-circuit voltage of the rechargeable battery; and
  querying a correspondence between the negative electrode open-circuit voltage of the rechargeable battery and the state of charge of the rechargeable battery based on the state of charge of the rechargeable battery to obtain the negative electrode open-circuit voltage of the rechargeable battery.

8. The method according to claim 1, wherein before the obtaining an open-circuit voltage of the rechargeable battery and a negative electrode open-circuit voltage of the rechargeable battery based on a state of charge of the rechargeable battery, the method further comprises:
  obtaining a correspondence between an open-circuit voltage of a first reference battery and a remaining capacity of the first reference battery based on a charging and discharging test performed on the first reference battery, and obtaining the correspondence between the open-circuit voltage of the rechargeable battery and the state of charge of the rechargeable battery based on the correspondence between the open-circuit voltage of the first reference battery and the remaining capacity of the first reference battery; or
  obtaining a correspondence between an open-circuit voltage of a second reference battery and a remaining capacity of the second reference battery based on a charging and discharging test performed on the second reference battery, and obtaining the correspondence between the negative electrode open-circuit voltage of the rechargeable battery and the state of charge of the rechargeable battery based on the correspondence between the open-circuit voltage of the second reference battery and the remaining capacity of the second reference battery, wherein a positive electrode material of the second reference battery is the same as a negative electrode material of the first reference battery, and a negative electrode voltage of the second reference battery is constant.

9. An apparatus, comprising:
  one or more processors; and
  a non-transitory computer readable medium storing a program to be executed by the one or more processors, wherein the program comprises instructions that cause the apparatus to perform operations comprising:
    obtaining an open-circuit voltage of a rechargeable battery and a negative electrode open-circuit voltage of the rechargeable battery based on a state of charge of the rechargeable battery;
    obtaining a negative electrode polarization voltage of the rechargeable battery based on the open-circuit voltage of the rechargeable battery, a terminal voltage of the rechargeable battery, and a polarization proportion of the rechargeable battery, wherein the polarization proportion of the rechargeable battery represents a proportion that is of the negative electrode polarization voltage of the rechargeable battery to a polarization voltage of the rechargeable battery and that is obtained when the rechargeable battery is at a lithium plating critical point;
    obtaining a negative electrode voltage of the rechargeable battery based on the negative electrode open-circuit voltage of the rechargeable battery and the negative electrode polarization voltage of the rechargeable battery; and
    determining, based on the negative electrode voltage of the rechargeable battery, whether lithium plating occurs in the rechargeable battery.

10. The apparatus according to claim 9, wherein the determining, based on the negative electrode voltage of the rechargeable battery, whether lithium plating occurs in the rechargeable battery comprises:
  when the negative electrode voltage of the rechargeable battery is less than a reference voltage threshold, determining that lithium plating occurs in the rechargeable battery.

11. The apparatus according to claim 9, wherein the obtaining a negative electrode polarization voltage of the rechargeable battery based on the open-circuit voltage of the rechargeable battery, a terminal voltage of the rechargeable battery, and a polarization proportion of the rechargeable battery comprises:
  obtaining the polarization voltage of the rechargeable battery based on the open-circuit voltage of the rechargeable battery, the terminal voltage of the rechargeable battery, and a first reference relationship, wherein the first reference relationship is a relationship among the open-circuit voltage of the rechargeable battery, the terminal voltage of the rechargeable battery, and the polarization voltage of the rechargeable battery; and
  obtaining the negative electrode polarization voltage of the rechargeable battery based on the polarization voltage of the rechargeable battery and the polarization proportion of the rechargeable battery.

12. The apparatus according to claim 9, wherein the operations further comprise:
  obtaining a polarization voltage of a first reference battery when the first reference battery is charged by using a target charging current and is at the lithium plating critical point;
  obtaining a negative electrode polarization voltage of the first reference battery when the first reference battery is charged by using the target charging current and is at the lithium plating critical point; and obtaining the polarization proportion of the rechargeable battery based on the negative electrode polarization voltage of the first reference battery and the polarization voltage of the first reference battery.

13. The apparatus according to claim 12, wherein the obtaining a polarization voltage of a first reference battery when the first reference battery is charged by using a target charging current and is at a lithium plating critical point comprises:

obtaining a state of charge of the first reference battery and a terminal voltage of the first reference battery when the first reference battery is charged by using the target charging current and is at the lithium plating critical point;

querying a correspondence between an open-circuit voltage of the first reference battery and the state of charge of the first reference battery based on the state of charge of the first reference battery to obtain the open-circuit voltage of the first reference battery; and obtaining the polarization voltage of the first reference battery based on the open-circuit voltage of the first reference battery, the terminal voltage of the first reference battery, and a second reference relationship, wherein the second reference relationship is a relationship among the open-circuit voltage of the first reference battery, the terminal voltage of the first reference battery, and the polarization voltage of the first reference battery.

14. The apparatus according to claim 12, wherein the obtaining a negative electrode polarization voltage of the first reference battery when the first reference battery is charged by using the target charging current and is at the lithium plating critical point comprises:

obtaining the state of charge of the first reference battery and a negative electrode voltage of the first reference battery when the first reference battery is charged by using the target charging current and is at the lithium plating critical point;

querying a correspondence between a negative electrode open-circuit voltage of the first reference battery and the state of charge of the first reference battery based on the state of charge of the first reference battery to obtain the negative electrode open-circuit voltage of the first reference battery; and obtaining the negative electrode polarization voltage of the first reference battery based on the negative electrode open-circuit voltage of the first reference battery, the negative electrode voltage of the first reference battery, and a third reference relationship, wherein the third reference relationship is a relationship among the negative electrode voltage of the first reference battery, the negative electrode open-circuit voltage of the first reference battery, and the negative electrode polarization voltage of the first reference battery.

15. The apparatus according to claim 9, wherein the obtaining an open-circuit voltage of the rechargeable battery and a negative electrode open-circuit voltage of the rechargeable battery based on a state of charge of the rechargeable battery comprises:

querying a correspondence between the open-circuit voltage of the rechargeable battery and the state of charge of the rechargeable battery based on the state of charge of the rechargeable battery to obtain the open-circuit voltage of the rechargeable battery; and querying a correspondence between the negative electrode open-circuit voltage of the rechargeable battery and the state of charge of the rechargeable battery based on the state of charge of the rechargeable battery to obtain the negative electrode open-circuit voltage of the rechargeable battery.

16. The apparatus according to claim 13, wherein the operations further comprise:

obtaining a correspondence between the of the first reference battery and a remaining capacity of the first reference battery based on a charging and discharging test performed on the first reference battery, and obtaining the correspondence between the open-circuit voltage of the rechargeable battery and the state of charge of the rechargeable battery based on the correspondence between the open-circuit voltage of the first reference battery and the remaining capacity of the first reference battery; or obtaining a correspondence between an open-circuit voltage of a second reference battery and a remaining capacity of the second reference battery based on a charging and discharging test performed on the second reference battery, and obtaining the correspondence between the negative electrode open-circuit voltage of the rechargeable battery and the state of charge of the rechargeable battery based on the correspondence between the open-circuit voltage of the second reference battery and the remaining capacity of the second reference battery, wherein a positive electrode material of the second reference battery is the same as a negative electrode material of the first reference battery, and a negative electrode voltage of the second reference battery is constant.

17. A method, comprising:

respectively obtaining at least two groups of charging parameters of a rechargeable battery having a same target state of charge in at least two charging processes of the rechargeable battery, wherein each group of charging parameters comprises a charging current of the rechargeable battery and a target voltage of the rechargeable battery, and the target voltage comprises a polarization voltage or a terminal voltage;

obtaining a correlation between the target voltage and the charging current based on the at least two groups of charging parameters of the rechargeable battery having the target state of charge; and when the correlation does not conform with a specified correlation, determining that lithium plating occurs in the rechargeable battery in a charging process.

18. The method according to claim 17, wherein the target voltage is the polarization voltage, and the respectively obtaining at least two groups of charging parameters of a rechargeable battery having a same target state of charge in at least two charging processes of the rechargeable battery comprises:

respectively obtaining terminal voltages of the rechargeable battery having the target state of charge in the at least two charging processes of the rechargeable battery;

obtaining, based on the target state of charge and a correspondence between an open-circuit voltage of the rechargeable battery and a state of charge of the rechargeable battery, target open-circuit voltages corresponding to the target state of charge; and respectively obtaining polarization voltages of the rechargeable battery having the target state of charge in the at least two charging processes based on the terminal voltages and the target open-circuit voltages that are obtained in the at least two charging processes.

19. The method according to claim 18, wherein before the respectively obtaining at least two groups of charging parameters of a rechargeable battery having a same target state of charge in at least two charging processes of the rechargeable battery, the method further comprises:

obtaining a correspondence between an open-circuit voltage of a first reference battery and a remaining capacity of the first reference battery based on a charging and discharging test performed on the first reference battery; and obtaining the correspondence between the open-circuit voltage of the rechargeable battery and the state of charge of the rechargeable battery based on the correspondence between the open-circuit voltage of the first reference battery and the remaining capacity of the first reference battery.

20. The method according to claim 17, wherein the specified correlation is obtained based on the target voltage of the rechargeable battery and a charging current less than a reference current threshold of the rechargeable battery having the target state of charge in a history charging process.

\* \* \* \* \*